United States Patent
Conlon

(10) Patent No.: US 11,455,870 B2
(45) Date of Patent: Sep. 27, 2022

(54) AUTOMATED MONITORING, DETECTION, AND REPORTING OF UNAUTHORIZED MOVEMENT AND/OR THEFT OF VEHICLES AND CARGO

(71) Applicant: OVERHAUL GROUP, INC., West Lake Hills, TX (US)

(72) Inventor: Barry Conlon, Leander, TX (US)

(73) Assignee: Overhaul Group, Inc., Austin, TX (US)

(*) Notice: Subject to any disclaimer, the term of this patent is extended or adjusted under 35 U.S.C. 154(b) by 0 days.

(21) Appl. No.: 17/200,714

(22) Filed: Mar. 12, 2021

(65) Prior Publication Data
US 2021/0287500 A1    Sep. 16, 2021

Related U.S. Application Data

(60) Provisional application No. 62/988,901, filed on Mar. 12, 2020.

(51) Int. Cl.
G08B 13/00    (2006.01)
G08B 25/00    (2006.01)
(Continued)

(52) U.S. Cl.
CPC ............ *G08B 13/00* (2013.01); *B60R 25/102* (2013.01); *B60R 25/23* (2013.01); *B60R 25/24* (2013.01);
(Continued)

(58) Field of Classification Search
CPC ......... B60R 25/10; B60R 25/20; B65R 25/23; B65R 25/24; B65R 25/30; B65R 25/34;
(Continued)

(56) References Cited

U.S. PATENT DOCUMENTS 10,652,735 B2 *  5/2020  Li ............................ H04W 8/20
10,814,833 B1 * 10/2020  Goetzinger ......... B60R 25/2018
(Continued)

FOREIGN PATENT DOCUMENTS

WO    2016093541 A1    6/2016

OTHER PUBLICATIONS

NPL Search (Jan. 24, 2022).*
(Continued)

*Primary Examiner* — Van T Trieu
(74) *Attorney, Agent, or Firm* — Isidore PLLC

(57) ABSTRACT

A method and an enhanced electronic logging device (ELD) enable a load lock feature of a vehicle that assists with automated theft detection, reporting, and tracking of stolen vehicles/cargo. The processor of the ELD enables the ELD to register the operator MCD to receive notifications generated by a load lock module and present on a display of the ELD at least one selectable option for activating a load lock of the vehicle, the load lock identifying that the operator has parked the vehicle and has triggered the ELD to report any movement of the vehicle that occurs while the load lock is activated. The processor generates and transmits a notification of unauthorized movement or a potential theft of the vehicle in response to receiving an input from the movement detection device indicating that the vehicle is moving or being moved from a parked location while the load lock is activated.

19 Claims, 11 Drawing Sheets

(51) Int. Cl.
*G08B 25/10* (2006.01)
*B60R 25/24* (2013.01)
*B60R 25/102* (2013.01)
*B60R 25/25* (2013.01)
*B60R 25/23* (2013.01)
*B60R 25/32* (2013.01)
*B60R 25/33* (2013.01)
*B60R 25/30* (2013.01)
*B60R 25/34* (2013.01)
*H04B 1/38* (2015.01)
*G06F 3/0482* (2013.01)
*H04W 76/10* (2018.01)

(52) U.S. Cl.
CPC ............ *B60R 25/25* (2013.01); *G08B 25/008* (2013.01); *G08B 25/10* (2013.01); *B60R 25/302* (2013.01); *B60R 25/305* (2013.01); *B60R 25/32* (2013.01); *B60R 25/33* (2013.01); *B60R 25/34* (2013.01); *B60R 2325/101* (2013.01); *B60R 2325/105* (2013.01); *G06F 3/0482* (2013.01); *H04B 1/38* (2013.01); *H04W 76/10* (2018.02)

(58) Field of Classification Search
CPC ...... G08B 13/00; G08B 25/00; G08B 25/008; G08B 25/10; H04W 12/00; H04W 12/04; H04W 12/08; E05B 81/72
See application file for complete search history.

(56) References Cited

U.S. PATENT DOCUMENTS

| | | | |
|---|---|---|---|
| 2009/0066488 A1* | 3/2009 | Qiahe | B60R 25/102 340/426.1 |
| 2011/0275321 A1* | 11/2011 | Zhou | H04M 1/72454 455/41.2 |
| 2012/0019361 A1 | 1/2012 | Ben Ayed | |
| 2018/0099712 A1 | 4/2018 | Bean et al. | |
| 2018/0338241 A1* | 11/2018 | Li | G08B 5/222 |
| 2018/0374284 A1 | 12/2018 | Ozturk et al. | |

OTHER PUBLICATIONS

Patent Cooperation Treaty (PCT) International Application No. PCT/US21/22243, International Search Report and Written Opinion, dated Jul. 21, 2021.

\* cited by examiner

AUTOMATED MONITORING, DETECTION, AND REPORTING OF UNAUTHORIZED MOVEMENT AND/OR THEFT OF VEHICLES AND CARGO

PRIORITY & RELATED APPLICATIONS

The present application claims priority from U.S. Provisional Application No. 62/988,901, filed on Mar. 12, 2020, with the entire content of that provisional application being incorporated herein by reference.

BACKGROUND

1. Technical Field

The present disclosure is generally related to security systems for vehicles and cargo, and in particular to a method, devices and systems for enabling security and tracking of vehicles and cargo.

2. Description of the Related Art

Theft of cargo transport vehicles, such as tractor-trailers and trucks, is a growing concern in the cargo transport industry. These theft events frequently occur when the operator/driver of the vehicle is outside of the vehicle, such as while at a truck stop or other public area. Normally, the operator exits the vehicle with his cellular phone and keys, unaware that the vehicle (or perhaps the cargo) may be a target for theft. The operator is only aware that the theft has occurred when he/she returns to the location where the vehicle was parked only to discover the vehicle is no longer at that location.

In the United States of America and several other countries, operators of these large vehicles are mandated to have an electronic logging device (ELD). The ELD is communicatively linked to the odometer of the vehicle and tracks/logs the number of miles driven by the operator in a single sitting, as well as other details related to the historical use of the vehicle and operator habits. With improvements in technology, ELDs have become sophisticated mini-computer devices having electronic microprocessors and touch-sensitive graphical user interfaces to allow the operator to easily interact with the device.

SUMMARY

The disclosed embodiments provide a method, a shipment tracking system, a mobile communication device, an electronic logging device, and a distributed wireless detection system that enable automated theft detection, reporting, and tracking of stolen vehicles and cargo.

According to one aspect, an enhanced electronic logging device (ELD) is provided. The ELD includes: a display device that presents at least one user interface (UI); at least one user input device; and at least one wireless transceiver that enables the ELD to wirelessly connect to external devices, including an operator mobile communication device (MCD). The ELD also includes at least one motion detection mechanism (MDM) that detects and reports movement of the vehicle. The ELD further includes a memory having stored thereon a plurality of modules, including a load lock module, which includes a movement notification module. A processor of the ELD is communicatively coupled to the display device, the at least one input device, the wireless transceiver, the MDM, and the memory. The processor executes the load lock module, which enables the ELD to register the operator MCD to receive notifications of unauthorized movement of the vehicle from the ELD. The load lock module also presents on a display of the ELD at least one selectable option for activating (and de-activating) a load lock of the vehicle (setting load lock to "on" or "off"). The load lock being "on" or activated identifies that the operator has parked the vehicle and has configured the ELD to report any detected movement of the vehicle away from the parked location while the load lock is activated. The processor configures the ELD to activate the load lock in response to receiving an input to turn on load lock. Whenever the load lock is set to "on", the processor automatically generates and transmits a notification of unauthorized movement of the vehicle in response to receiving an input from the motion detection device indicating that the vehicle is moving or being moved from a parked location.

In one embodiment, in order to generate and transmit the notification, the processor configures the ELD to activate a wireless transmission system of the ELD, initiate a wireless connection with the operator MCD, and transmit the notification directly to the operator MCD via the wireless connection.

In an alternate embodiment, to generate and transmit the notification, the processor configures the ELD to establish, via a corresponding wireless transmitter, an uplink to a base station of a communication network and to transmit, via the communication network, the notification to at least one of a shipment monitoring (SM) server, a law enforcement (LE) connect server, or an authorized third-party device.

According to one or more embodiments, in response to detecting the movement of the vehicle while the load lock is on, the processor further configures the ELD to generate and output a prompt for entry of at least one of a passcode or a biometric input to deactivate the load lock. The processor monitors for receipt of the entry and configures the ELD to terminate the notification to the operator MCD in response to receipt of an entry that matches a corresponding one of the passcode or the biometric input.

According to one aspect, the at least one wireless transceiver includes at least one of a Bluetooth (BT) transmitter or a radio frequency identification (RFID) transmitter. The BT or RFID transmitter is pre-coded with a unique identification (ID) (or signature) and can generate a beacon carrying the unique ID when triggered. The BT or RFID transmitter is maintained in a sleep/dormant state until triggered by operation of a load lock security event (LLSE) trigger that causes the BT transmitter to initiate transmission of a BT beacon, encoded with the unique signature, in response to the unexpected movement detected following activation of the load lock.

According to one aspect, the ELD is configured with a BT tag detection and reporting (TDR) module stored within the memory of the ELD, and the ELD includes, or is communicatively coupled to, a BT receiver. The processor executes the BT TDR module to configure the ELD to receive a BT ID tracking notification that includes a BT tag ID associated with one of a vehicle and a cargo that is being tracked. The notification can be received via one of a manual input and a push update (or download) from a SM server or the operator MCD. In response to receiving the tracking notification, the processor stores the BT tag ID and activates the BT TDR tracking module, which causes the BT receiver to initiate scanning for BT beacons within a detection range of the BT receiver. Further, in response to the BT receiver detecting a next BT beacon, the reader forwards the BT beacon to the processor, which compares an ID from the BT beacon to the stored BT tag ID being tracked. In response to the ID of the BT beacon matching the stored BT tag ID, the processor generates an ID-detected notification, including the BT ID and a current vehicle location and time, and outputs the ID-detected notification on the ELD. Additionally, the processor causes the ELD to transmit the ID-detected notification to at least one of the operator MCD, the SM server, a law enforcement (LE) connect server, and an authorized third party.

In accordance with another aspect, a method for tracking vehicles and cargo is implemented within an ELD. The method includes the functional processes presented in the above summary of the ELD performed processes.

According to another aspect, an operator MCD is presented. The operator MCD includes a MCD display device, a MCD wireless transceiver, a MCD memory having a load lock notification module stored thereon, and an MCD processor communicatively coupled to the MCD display, MCD wireless transceiver, and MCD memory. The MCD processor configures the operator MCD to register with the ELD for receipt of load lock security notifications generated as a result of movement of the vehicle while the load lock is on. In response to receipt of the notification from the ELD, the MCD processor generates a prompt on the MCD display to trigger the operator to indicate whether the vehicle's movement is authorized. The MCD processor further monitors for receipt of an entry, within a preset timeout period, of one of a preset passcode or pre-stored biometric input, correct entry of which indicates that the vehicle's movement is authorized. The MCD processor transmits at least one unauthorized movement signal to one or more of (a) a shipment tracking server, (b) a law enforcement dispatcher server, and (c) a device of an authorized interested person, in response to at least one of (i) not receiving a correct deactivation entry within the time-out period or (ii) receiving an entry identifying at least one type of active incident or a type of desired response that requires reporting.

According to one or more embodiments, to generate the prompt, the MCD processor generates and outputs an audible and/or visible notification notifying the operator of an unauthorized movement which may be a potential theft event involving the movement of the vehicle. The MCD processor further outputs selectable options to the operator from among: (i) disregarding the load lock notification as being associated with vehicle movement that is authorized or is being performed by the operator; (ii) de-activating the load lock on the ELD; (iii) notifying law enforcement of the incident; (iv) notifying a SM service; and (v) capturing and transmitting an image of a cab interior of the vehicle via one of an ELD camera or a secondary camera installed within the vehicle to capture an image of the driver space of the vehicle. In response to receipt of a selection corresponding to notifying law enforcement, the MCD processor generates an incident report including pre-entered/pre-stored identifying details of one or more of (i) the operator, (ii) the operator MCD, (iii) the vehicle, and (iv) cargo being transported. The incident report also includes a current location and time of the incident and a BT tag ID associated with the vehicle or cargo. The MCD processor forwards the incident report to one or more of a LE dispatcher system, a SM server, and/or to a device of an authorized interested party.

As one final aspect of the disclosure, a method for tracking and detecting a location of stolen vehicles and cargo is performed within a distributed environment having a SM server and geographically dispersed Bluetooth (BT) beacon detection devices. The method includes receiving data identifying a unique Bluetooth (BT) tag that is assigned to a registered vehicle transporting cargo that is being monitored by a shipment tracking service. The BT tag includes a unique identifier and is physically located with/within the vehicle. The method includes associating the unique ID of the received BT tag with other identifying information of the shipment vehicle/cargo/operator and storing the unique ID and associated identifying information to a database of tracked vehicles or shipments. The method then includes receiving, at a SM server, from at least one of an operator MCD or an enhanced electronic logging device (ELD), a notification, such as a load lock notification, with information indicating that the vehicle has been stolen or is being driven away from an expected location of the vehicle. The method further includes parsing the notification to retrieve the vehicle or operator ID and retrieving the unique ID of the BT tag from the database, based on the received vehicle or operator ID. The method includes transmitting the unique ID to a plurality of BT beacon detection devices that are geographically located in a surrounding geographical area of the location from which the vehicle was taken. The method includes transmitting an activation signal to trigger the BT signal detection devices to initiate monitoring operations to detect BT beacons within a detection range of the BT signal detection devices.

In one embodiment, in response to detecting a BT beacon, the BT signal detection devices automatically compare the unique ID of the detected signal with the unique ID received from the SM server to identify any matches in the two unique IDs. Detected matches are then transmitted to the SM server along with location and time data. The method includes monitoring for receipt of a confirmed detection of the unique ID by one or more of the BT signal detection devices. The method further includes, in response to receipt of the confirmed detection, recording a current location of the reporting BT signal detection device(s) and time(s) of the confirmed detection and updating the database with confirmed detection information, including the time and location and any additional information received. The method also includes transmitting relevant details of the confirmed detection to law enforcement and/or other authorized interested parties.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which.

DESCRIPTION OF ILLUSTRATIVE EMBODIMENTS

Figure 1A:
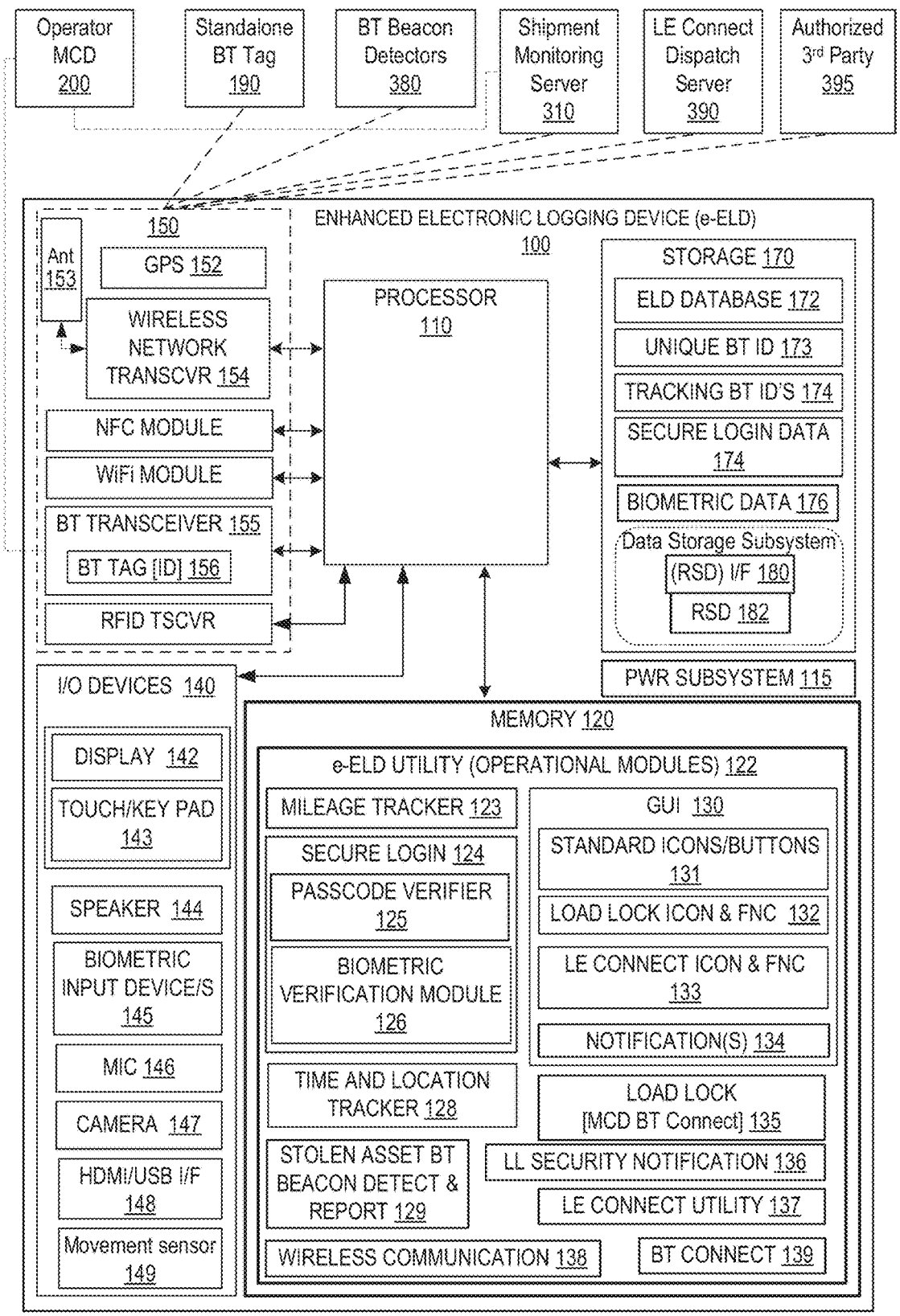
FIG. 1A illustrates an example electronic logging device (ELD) configured with a load lock function and a law enforcement connect (LEC) function as enhanced security features for protecting an associated vehicle and/or cargo, in accordance with one or more embodiments.

The illustrative embodiments of the present disclosure provide a method, one or more devices, and a distributed system that enables automated theft detection, reporting, and tracking of stolen vehicles and/or cargo. The distributed system can include a shipment tracking system and/or a distributed wireless detection system. The devices can include an operator mobile communication device and an enhanced electronic logging device (ELD). According to a first aspect, the vehicle being tracked is equipped with an enhanced electronic logging device (ELD) and a Bluetooth (BT) transceiver. The BT transceiver is pre-coded with a unique identifier (ID) (or signature) and is embedded in the ELD or in the vehicle to prevent easy removal.

According to one aspect, the processor of the ELD enables the ELD to register the operator MCD to receive notifications generated by a load lock module and present on a display of the ELD at least one selectable option for activating a load lock of the vehicle, where the load lock identifies that the operator has parked the vehicle and triggered the ELD to report any movement of the vehicle that occurs while the load lock is activated. The processor generates and transmits a notification of an unauthorized movement or a potential theft of the vehicle in response to receiving an input from a movement detection device (or sensor) indicating that the vehicle is moving or being moved from a parked location while the load lock is activated.

According to one aspect, the method includes integrating a load lock feature within the ELD. The load lock feature enables an operator to identify when the vehicle is in a parked state, and the ELD is pre-programmed to require the load lock to be overridden by entry of an operator's lock-release code or biometric data before the vehicle continues/resumes moving. The load lock can be activated when the operator is at a truck stop or parked at a pick-up location or drop-off location while the operator is outside of the vehicle.

In one or more embodiments, the load lock can be activated autonomously based on one or more triggers, such as (i) the ELD 100 periodically implementing a presence scan and detecting when the operator has left the vehicle or moved from the driver's seat; (ii) the ELD 100 losing a connection to the operator MCD 200 as the operator walks away from the vehicle or if a jamming of signals occurs preventing connection to the operator MCD 200; (iii) detection of the vehicle's fuel access door being open, suggesting the vehicle is being refueled; etal. Autonomous activation of load lock allows for tracking of the device in situations where the operator forgets to manually activate load lock before the operator leaves the vehicle or when the vehicle is already too far away for the operator to activate load lock from the operator MCD because the BT signal is out of range.

The method further includes enabling an operator mobile communication device (MCD) to establish a communication link between the ELD and the operator MCD and register with the ELD to receive notifications about load lock security events (LLSEs). The method further includes enabling operator selection of the load lock icon to activate the load lock, and in response to activation of the load lock, modifying the ELD to respond to detected movement of the vehicle by automatically generating and transmitting a LLSE notification to the MCD to alert the operator (or other user of the MCD) of the detected movement whilst the load lock is activated. In one embodiment, the LLSE notification is received as an activation signal that triggers the registered operator MCD to output a locally generated notification of the unexpected movement of the vehicle. Further, the method includes de-activating the load lock feature in response to receipt of an operator override input or confirmation of the operator presence in the vehicle via passcode entry or biometric authentication.

As provided within the disclosure, it is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

The majority of the terms utilized herein are generally known to those in the shipping industry. Certain coined terms are utilized herein in describing the unique features and functionality of the disclosure. Throughout the description, the term shipment refers primarily to the transportation of cargo via a transport vessel from an origination point (shipper) to a delivery point/destination. Several other terms utilized throughout the disclosure are provided with functional descriptive names that represent the meanings and/or the context in which the terms are presented and/or utilized. Within the description of the features of the disclosure and the accompanying drawings, the embodiments are presented from the perspective of a vehicle, illustrated as a tractor-trailer, within a SM environment. In this context, a "shipment" includes a cargo being transported by the vehicle. It is appreciated that while presented as a tractor-trailer vehicle, the disclosure extends to different types of on-terrain transport equipment available, including, but not limited to, flatbeds, dry vans, refrigerated trucks, trains, etc. It is understood that the features and functionality described herein can also be applicable to different types of on-land motorized equipment, such as vans, trucks, cars, RVs, busses, motorcycles, and the like, without limitation. Further, the vehicle can, in some limited instances, be non-motorized vehicles, such as bicycles and other non-motorized forms of transportation.

For simplicity and completeness, the disclosure is described from the perspective of a shipment that includes a cargo being transported over ground by a vehicle that is a tractor-trailer, equipped with an ELD, where the vehicle operator is the driver, who has an operator MCD. Notably, certain aspects of the disclosure have general applicability to situations that are not shipment related. A driver of any vehicle can benefit from having the load lock feature integrated within the vehicle and on his/her cell mobile device, without having to be transporting any cargo or linked within any SM environment.

Within the disclosure, the term relevant or interested or authorized party refers to and/or can include one or more, or all of, the owner of the cargo, the shipper, the owner of the transport vehicle, if different from the operator, the intended recipient of the cargo, an insurance company that insures one or more of the shipment-related entities (i.e., truck, trailer, cargo, operator, shipper, cargo recipient, etc.), and others with a vested interest in the cargo and/or the transport vessel, and/or the operator. According to one aspect, each vehicle or shipment can have a different list of relevant or interested parties.

The accompanying figures present various aspects and/or features of the described embodiments, with certain features not expressly presented within the description herein. The following description of the illustrative embodiments can therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. Those of ordinary skill in the art will appreciate that the basic configurations depicted in the figures may vary. The illustrative components are not intended to be exhaustive, but rather are representative to highlight essential components that are utilized to implement aspects of the described embodiments. For example, other devices/components/features may be used in addition to or in place of the ones depicted and/or described. The depicted example is not meant to imply design, usage, or other limitations with respect to the presently described embodiments and/or the general innovation.

Within the descriptions of the different views of the figures, similar elements are provided similar names and reference numerals as those of the previous figure(s). It will be appreciated that for simplicity and clarity of illustration, elements illustrated in the figures have not necessarily been drawn to scale. For example, the dimensions of some of the elements can be exaggerated relative to other elements.

Those of ordinary skill in the art will appreciate that the hardware, firmware/software utility, and software components and basic configuration thereof depicted in the following figures may vary. For example, the illustrative components of ELD 100 (FIG. 1A-1B), operator mobile communication device (MCD) 200 (FIG. 2A-2B) and SM server 310 (FIG. 7) are not intended to be exhaustive, but rather are representative to highlight some of the components that are utilized to implement certain of the described embodiments. For example, different configurations of either SM server 310 or operator MCD 200 may be provided, containing other devices/mechanism/components/features, which may be used in addition to or in place of the hardware depicted and/or described, and the devices may be differently configured. The depicted examples are therefore not meant to imply architectural, usage, or other limitations with respect to the presently described embodiments and/or the concepts of the general disclosure.

Referring now to the figures, it is appreciated that the features and functionality illustrated by the figures are not fully described by the brief descriptions, which serve only to introduce these features as ones known to the inventors at the time of submission of this disclosure. Additional features and functionality extend from the presented figures as natural extensions thereof, such as specific graphical user interfaces, specific types of notification, protocols utilized for communication, etc. Nothing within the presented figures is intended to be limiting with respect to any aspect of the innovation.

FIG. 1A provides an example enhanced electronic logging device (ELD) 100 utilized within a shipping vessel (e.g., vehicle 320, FIG. 3) and having capabilities to wirelessly communicate with several different external devices, according to one or more embodiments. As a core function, ELD 100 is utilized to record an operator's driving characteristics, including number of miles logged. According to one aspect of the disclosure, ELD 100 is further enhanced/configured with a load lock function and a law enforcement connect (LE) function to provide enhanced security of the vehicle (320), in accordance with one or more embodiments.

The ELD 100 includes a display device (display) 142 that presents at least one graphical user interface (GUI) 130, at least one user input device (e.g., touchpad 143 and microphone 146), and at least one wireless transceiver (generally 150) that wirelessly/communicatively connects to external devices including an operator mobile communication device (MCD) 200 (FIG. 2). The ELD 100 also includes at least one motion detection (MD) device from among of (i) an integrated motion sensor 149; and (ii) an interface 148 for connection to an external motion sensor; (iii) a global positioning system (GPS) tracker 152; (iv) and a wireless network transceiver 154 that enables movement detection via triangulation or distance measurement to a set network access point or node. The ELD further includes a memory 120 having stored thereon a plurality of function modules 122 including a vehicle mileage tracker module 123, a secure login module 124 including one or both of passcode/password verifier 125 and biometric verification module 126, and time and location tracking module 128. The function modules 122 also include BT beacon detection and reporting (BBDR) module 129, a load lock module 135, a LLSE notification module 136, a law enforcement connect module 137, a wireless network communication module 138, and a near field communication module, e.g., BT connection module 139. The specific use and functionality of specific ones of these modules will be provide within the descriptions which follow. Each of these modules include program instructions, code, and/or data that when executed by processor 110 enables ELD 100 to perform the various processes described herein via operation of processor 110 and or other components within ELD 100.

Processor 110 of ELD 100 is communicatively coupled to the display device 142, the at least one input/output device (140), wireless transmitter/transceiver 154, BT transceiver 155, and memory 120. Processor 110 executes selected ones of the plurality of function modules 122 (e.g., MCD BT connect code of load lock module 135) to enable the ELD 100 to register the operator MCD 200 to receive notifications from the load lock module 135 via BT transceiver 155 or other near field connection (e.g., RFID). Processor 110 also presents on display device 142 of the ELD at least one selectable option for activating a load lock of the associated vehicle (not shown), the activation of the load lock identifying that the operator has parked the vehicle and triggered the ELD 100 to report any movement of the vehicle that occurs while the load lock is activated. The processor 110 causes the ELD 100 to activate the load lock in response to receiving an input (e.g., via integrated touch/keypad 143 of display 142) that turns the load lock on. With the load lock activated, the load lock module 135 and lock security notification module 136 triggers the processor 110 to generate and transmit a LLSE notification (350, FIG. 3) of unauthorized movement and/or a potential theft of the vehicle in response to receiving an input from the movement device (e.g., motion sensor 149) indicating that the vehicle is moving or being moved from a parked location while the load lock is activated.

Figure 1B:
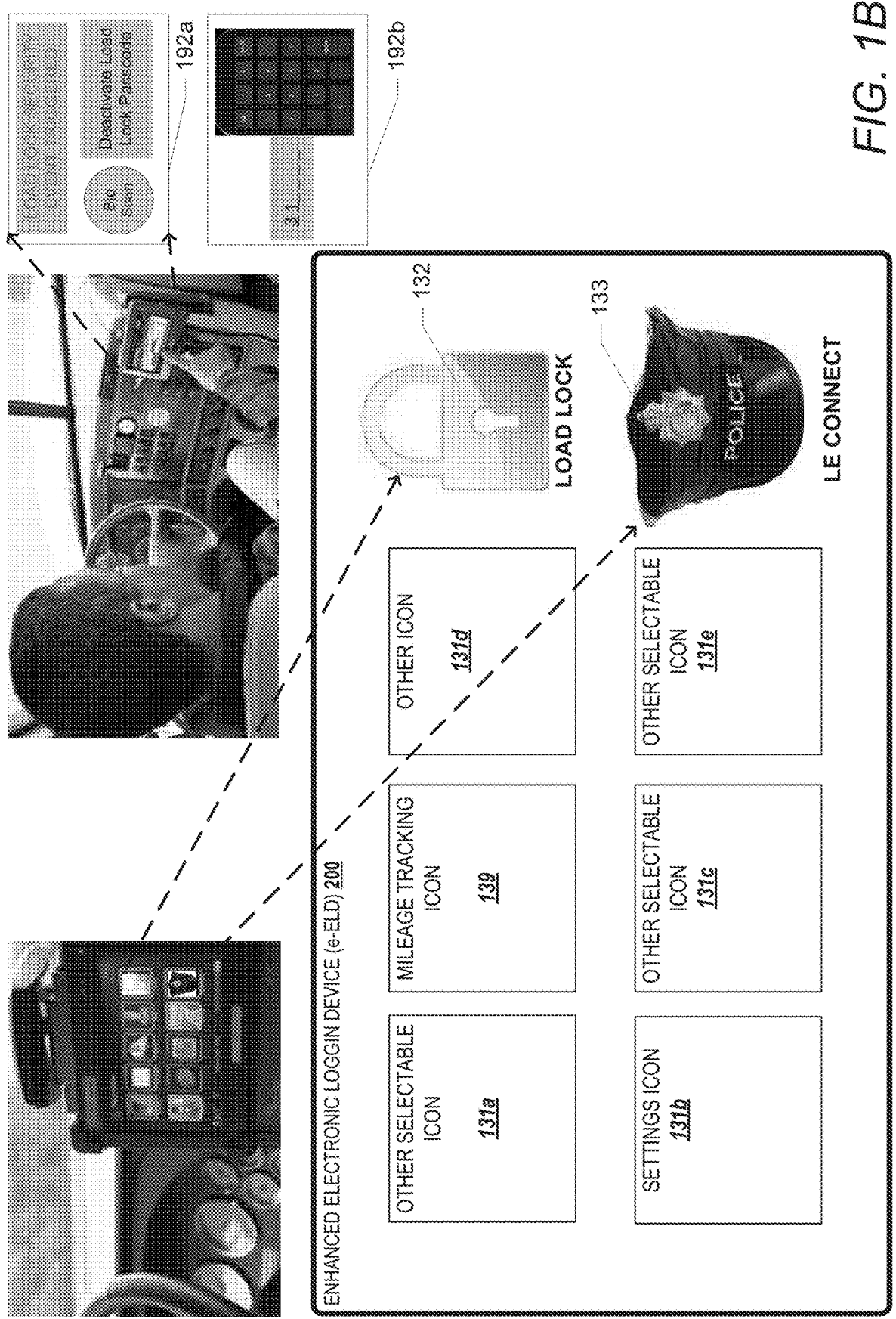
FIG. 1B illustrates example implementations of the graphical user interface of an ELD within a vehicle, with load lock and LE connect features presented, in accordance with one or more embodiments.

With reference now to FIG. 1B and ongoing reference to FIG. 1A. FIG. 1B illustrates example implementations of the ELD within a vehicle, and further illustrates the selectable icons on a graphical user interface, which includes the load lock icon and LE connect icons for operator selection, in accordance with one or more embodiments. The ELD 100 provides a plurality of selectable icons within a user interface presented on display device 142. To provide the visual interface features of ELD 100, memory 120 also includes a graphical user interface (GUI) 130, which include standard selectable icons or buttons 131, mileage tracking icon 123*b*, load lock icon 132, which provides underlying load lock functionality when selected, LE connect icon 133. GUI 130 also presents a notification screen 192*a* with one or more notifications 194 generated by notification module 134 in response to a LLSE. FIG. 1B also provides two views A and B of example ELDs 200 installed in or attached to a respective dashboard within a respective vehicle. In both implementations, ELD 100 has a field of view that includes the driver's seat and the operator or other person sitting in the driver's seat. Embedded camera 147 of ELD 100 is thus able to capture an image of who is driving the vehicle whenever a LLSE occurs (or is detected).

In the first presented image, ELD 100 is on a home screen that includes the load lock icon 132 and LE connect icons 133. The second presented image provides ELD on the security notification screen. Example content of the LLSE screen is presented in first load lock screen 192*a*, which provides a notification that the LLSE has been triggered. This notification is presented once movement of the vehicle is detected while the load lock is still activated. In one embodiment, the notification is not presented on ELD, but instead presented on the operator MCD 200. In another embodiment, the notification is presented on both devices. Notification screen also presents two operator verification options, including a biometric verification or entry of a secure passcode. In the presented embodiment, a fingerprint scanner 193 is provided on the display to allow the operator to quickly authenticate and de-activate the load lock, as illustrated by the second image (view B). Assuming the passcode entry is selected, a second authentication screen 192*b* is presented with a keypad for use to enter the passcode. In the presented example, a five-digit passcode is required. However, this is merely for illustration as the number of digits and whether alpha characters are included within the passcode can vary across different embodiments. To implement this load lock deactivation process, the processor 110 configures the ELD 100 to generate and output a prompt for entry of at least one of a passcode or a biometric input to remove the load lock status, in response to detecting the movement of the vehicle while the load lock is on. The processor monitors for receipt of the entry and configures the ELD 100 to de-activate the load lock and terminate the LLSE notification to the operator MCD 200 (and on the display 142) in response to receipt of the entry that matches a corresponding one of the pre-established passcode or the pre-stored biometric data. In one embodiment, the biometric data can be a voice print of the operator. The operator can then speak a pass phrase/word that is captured by microphone 146 and analyzed by biometric verification module 126 to confirm the identity of the operator and de-activate the load lock.

Returning to FIG. 1A, ELD 100 include storage 170 within which is stored an ELD database 172 with mileage, speed, and other data related to driving of the vehicle. Storage 170 also includes unique BT beacon ID 173 of the BT Tag 156 and tracking BT beacon IDs 174 received from SM server 310 for a stolen vehicle. Storage 170 further includes secure login data 175 (e.g., passcode to unlock ELD or to deactivate load lock) and biometric data 176. While a main physical storage is provided, storage 170 may also include removable storage device 182 that is inserter or otherwise communicatively coupled to ELD via an RSD interface 180. Removable storage device 182 can be defined as non-transitory, in one embodiment, and can contain the computer instructions for one or more of the modules presented within memory 120 that enable operation of the various ELD functionality, as described herein.

Wireless communication subsystem 150 of ELD 100 includes GPS receiver 152, wireless network transceiver 154 coupled to antenna 153, near field communication module 157, and RFID transceiver 158. Wireless communication subsystem 150 also includes BT transceiver 155, with an embedded BT tag having a unique BT tag ID 156. Wireless communication subsystem 150 enables ELD 100 to wirelessly communicate with devices external to ELD. An example set of these external devices includes operator MCD 200, stand alone BT tag 190 (which can be embedded within the vehicle or attached to the cargo, in an alternate embodiment), BT beacon detectors 390, and SM server 310. As described further in the description of FIG. 3, BT transceiver can be triggered by notifications module 134 or load lock module 135 to transmit a BT beacon with unique BT ID 173 in response to a LLSE. BT beacon detectors 380 are then able to detect a BT beacon being emitted from a passing vehicle or a vehicle in the detection range of the BT beacon detector 380.

In one embodiment, to generate and transmit a LLSE notification, processor 110 configures ELD 100 to activate a wireless transmission system 150 of the ELD 100, initiate a wireless connection with the operator MCD 200, and transmit the notification directly to the operator MCD 200 via the wireless connection.

Figure 3:
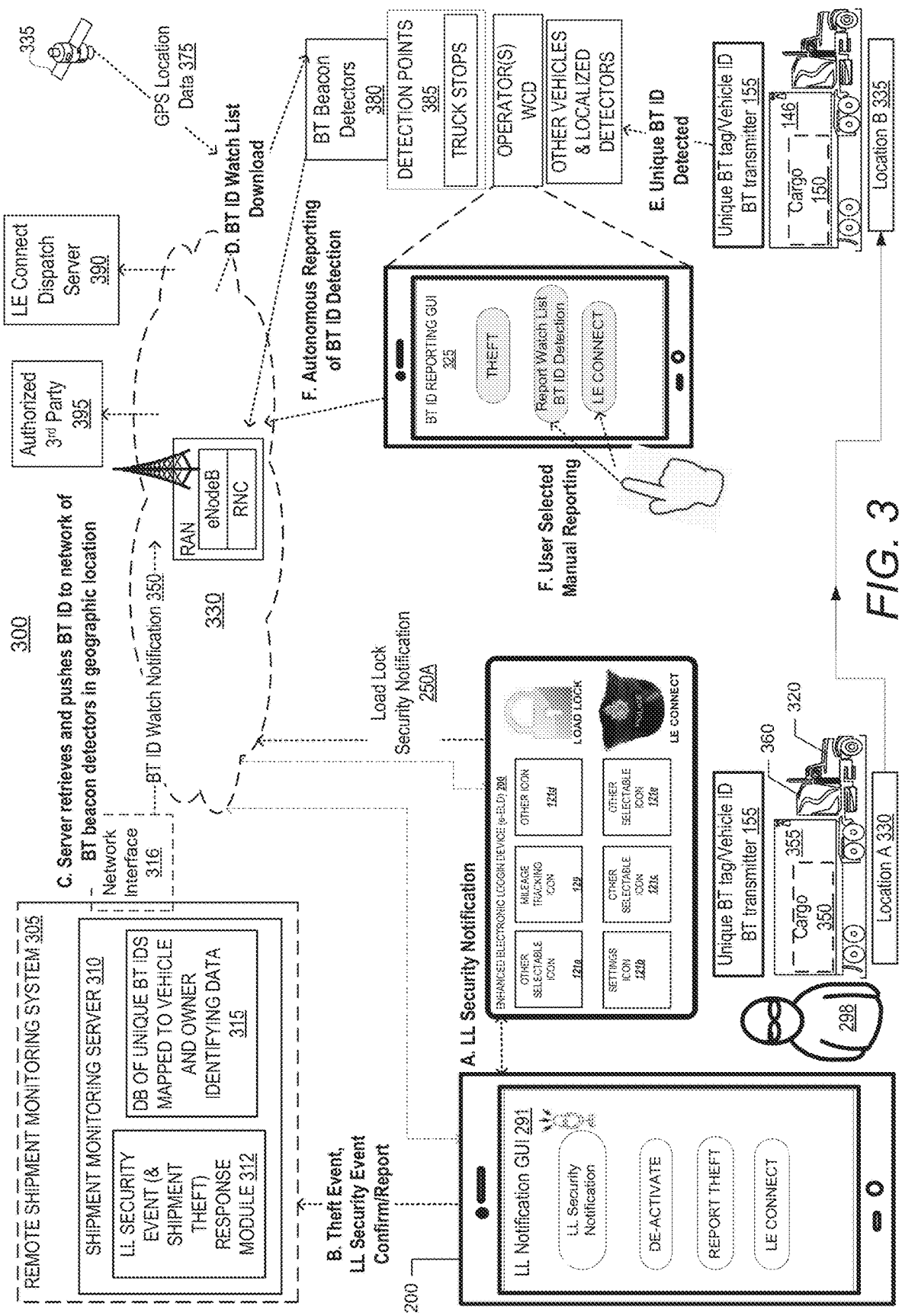
FIG. 3 illustrates a distributed shipment monitoring environment having multiple end devices that collaborate to enable tracking of a stolen vehicle/cargo that has an embedded BT tag with unique BT ID and an associated ELD with load lock capabilities, in accordance with one or more embodiments.

In an alternate embodiment, to generate and transmit the LLSE notification, processor 110 configures ELD 100 to establish, via a corresponding wireless network transceiver (154), an uplink to a base station of a communication network and to transmit the notification to a SM server 310 via the communication network (see FIG. 3).

According to one or more embodiments, the at last one wireless transceiver comprises at least one of a Bluetooth (BT) transmitter (155) or a radio frequency identification (RFID) transmitter (158). The BT or RFID transmitter 155/158 is pre-coded with a unique identification (ID)/signature (156) and is embedded in the ELD 100 or the vehicle to prevent easy removal. The BT or RFID transmitters 155/158 are maintained in a sleep/dormant state until triggered to initiate transmission of the unique BT tag ID in response to the unexpected movement of the vehicle that is detected following activation of the load lock.

According to one aspect, the ELD 100 is configured with a BT beacon detection and reporting (BDR) module 129 stored within the memory 120 of the ELD 100, and the ELD 100 includes or is communicatively coupled to a BT beacon detection component, BT receiver (155). The processor 110 executes the BT BDR module 129 to configure the ELD 100 to receive, via one of a manual input and a SM server download/broadcast, a watchlist message (see FIG. 3) that includes a second BT ID (174) associated with another vehicle and/or a cargo within the other vehicle that has an in-progress LLSE (i.e., the other vehicle and/or cargo is being searched for).

In response to receiving the watchlist message, the processor 110 stores the second BT ID 174 and activates the BT TDR process, which causes the BT receiver (155) to initiate scanning for BT beacons within a range of detection of the BT receiver (155). Further, in response to the BT receiver (155) detecting a next BT beacon, the processor 110 parses the BT beacon for the unique BT ID and compares the BT ID of the BT beacon to the stored second BT IDs 174. In response to the beacon BT ID of the BT beacon matching the stored second BT ID 174, the processor 110 generates an BT ID-detected notification, including the BT ID and a current vehicle location and time, and outputs the BT ID-detected notification at the ELD 100. Additionally, the processor 110 causes the ELD 100 to transmit the BT ID-detected notification to at least one of the operator MCD 200, the SM server 310, a LE connect server 390, and an authorized third party 395.

Figure 2A:
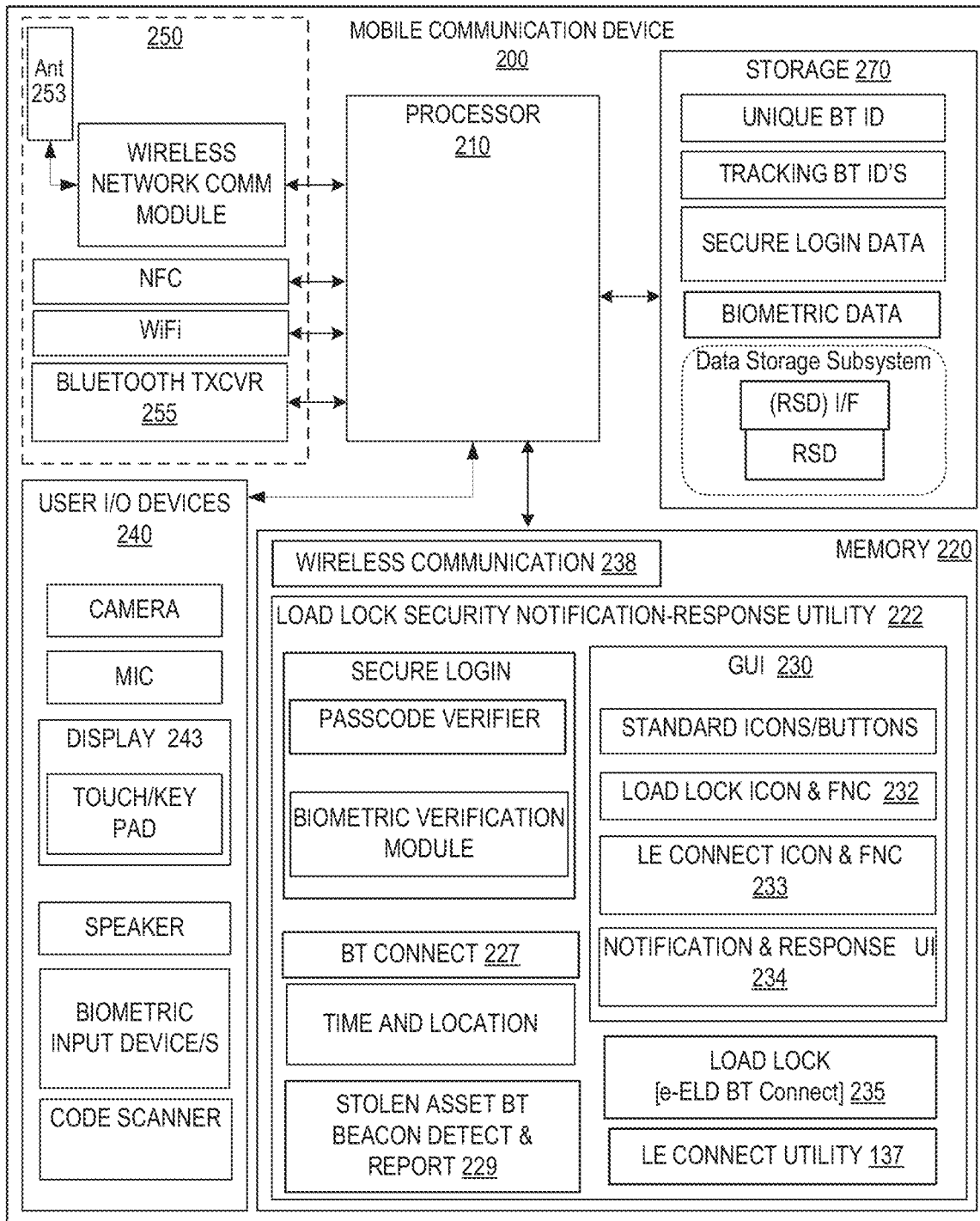
FIG. 2A illustrates an example mobile communication device (MCD) configured to provide a load lock security event response based on receipt of notifications from the ELD and a Bluetooth (BT) beacon transmitter, in accordance with one or more embodiments.

With reference now to FIG. 2A, there is illustrated an example operator mobile communication device (MCD) 200 configured with specific features and functionality to enable the operator to link to, communicate with, and receive signals and/or notifications from the ELD 100 (FIG. 1), a BT beacon transmitter (155, FIG. 1) and/or SM server 310, in accordance with a plurality of embodiments. The MCD 200 can be one of a smartphone, tablet, or other portable computing device. In one embodiment, operator MCD 200 is configured to provide several of the load lock functions previously described as being integrated or performed by ELD 100. Thus, the description of operator MCD 200 is abbreviated to not provide a repeat description of those components and features that have been previously described in FIG. 1. Instead, the description focusses primarily on the components and features that are unique to operator MCD 200 or different in their implementation on operator MCD 200 from implementation on ELD 100. Operator MCD 200 is configured with a memory 220 having stored thereon a load lock security event notification and response (LLSNR) utility 222 that is executed by the processor 210 of the MCD 200 to enable the MCD 200 to perform a series of functions, as described herein. LLSNR utility 222 includes a plurality of function modules, including secure login module 224, communication modules allowing for BT connection (227) and wireless communication (238) with other devices and networks, such as ELD 100 (FIG. 1) and SM server 310 (FIG. 3). LLSNR utility 222 also includes graphical user interface 230 presenting a plurality of different icons and information, including a notification and response user interface 234, and others.

Figure 2B:
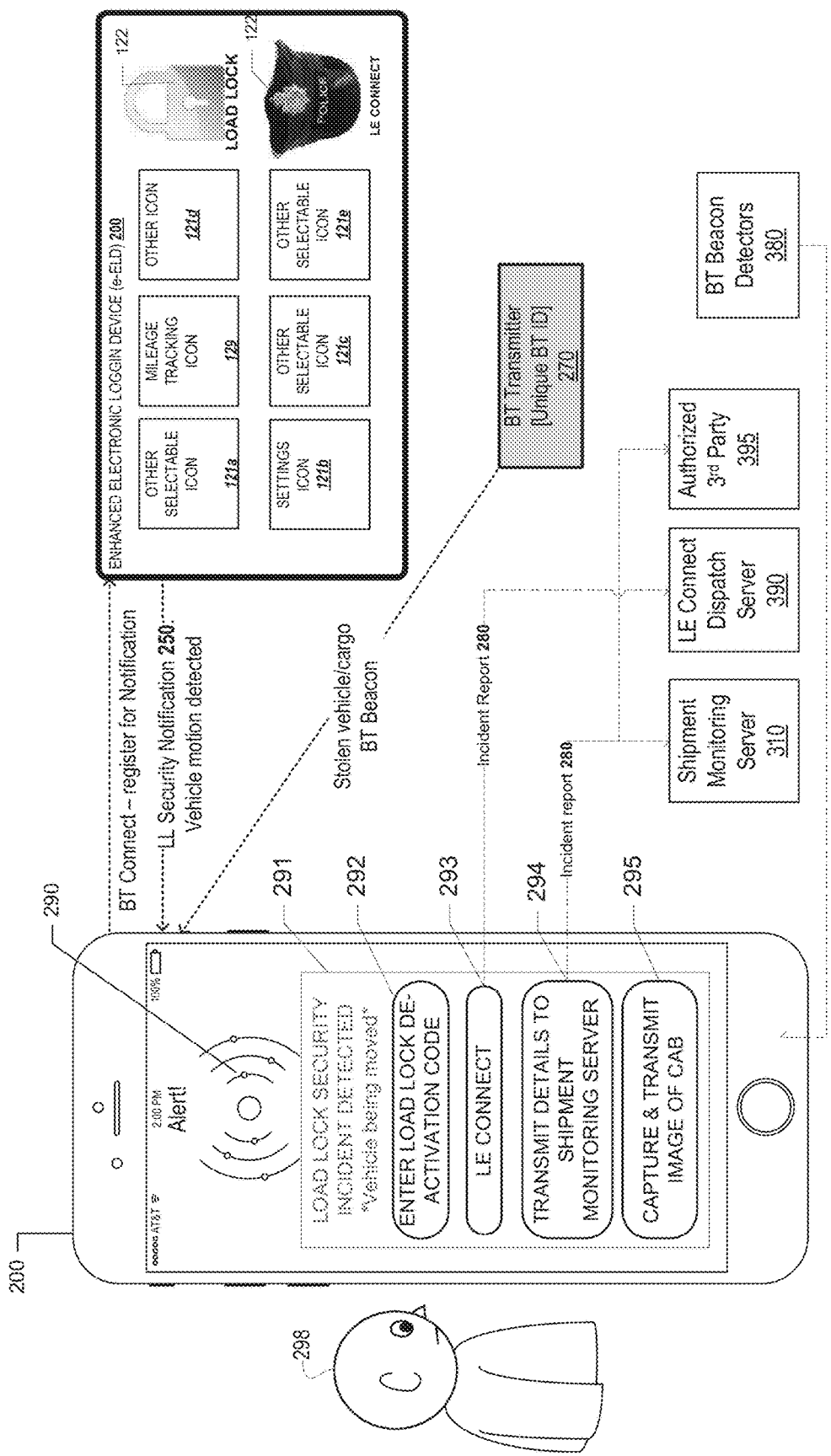
FIG. 2B illustrates example operation of and interfacing with the MCD of FIG. 2A, which is wirelessly linked to the ELD, a BT transmitter transmitting a BT beacon with unique BT ID, and to third party devices requiring notification of security events, in accordance with a plurality of embodiments.

BT connect module 227 enables operator MCD 200 to wirelessly connect to an ELD 100 and register with the ELD 100 as a receiving device for load lock notification. As illustrated by FIG. 2B, in response to later receiving a notification from the ELD 100 that indicates detection of movement of the vehicle while the ELD has load lock activated, the MCD 200 generates and outputs notification and response user interface 234 with an audible notification 290 or visible notification 291 to the operator 298 of the unauthorized movement or potential theft event involving the movement of the vehicle. The MCD 200 also outputs selectable options to the user including: (i) disregard alarm as movement that is authorized by or being performed by operator; (ii) de-activate (292) load lock on ELD; (iii) notify (293) law enforcement of the incident; and (iv) transmit (294) details of the security notification to a monitoring server of the shipment tracking service; and (v) capture and transmit (295) an image of the cab interior using an ELD camera or secondary camera installed within the vehicle to capture an image of the driver space of the vehicle. FIG. 2B illustrates several of these selectable options presented on notification and response user interface 234. In response to receipt of a selection corresponding to notifying law enforcement (293), MCD 200 further generates an incident report 280 including (a) pre-entered/pre-stored identifying details of one or more of (i) the operator, (ii) operator MCD, (iii) vehicle, and (iv) cargo, and (b) a current location and time of the incident, and (c) any BT tag ID associated with the vehicle or cargo. The MCD 200 then forwards the incident report to a LE connect server 390 and to a shipment tracking server 310 (FIG. 3) and/or other authorized interested parties 395.

Turning now to FIG. 3, there is illustrated an example shipment tracking and communication environment 300 for use in monitoring shipments being completed using operator-controlled transport vehicles, such as a tractor trailer, equipped with an ELD 100, according to one or more embodiments. As shown, the tractor trailer vehicle 320 (hereinafter, vehicle 320) is carrying cargo 350 and is initially at location A 330. Vehicle 320 includes enhanced electronic logging device (ELD) 100, which is designed and/or configured to include the functionality of a load lock feature and a law enforcement connect feature. Vehicle 320 also includes a Bluetooth (BT) tag 360, which is programmed to transmit a BT identification signal associated with and unique to the vehicle 320. Vehicle 320 may also be equipped with a built-in network connection device 355 by which direct connection with an external network 330 can be established.

Shipment tracking and communication environment (STCE) 300 includes remote SM system 305, which includes SM server(s) 310. Shipment monitoring server 310 includes a load lock event response module 312 and a database 315 of unique BT IDs that are mapped to identifying data of associated vehicles and/or owner/operator data. In the illustrated embodiment, load lock event response module 312 can also incorporate the features of a shipment theft response module. Shipment monitoring server 310 includes a network interface 316 by which server 310 communicatively connects to a plurality of other devices across STCE 300 via distributed communication network 330. Distributed communication network 330 is a collective of wide area network and a wireless communication network having radio access network (RAN) with a base station (eNodeB), antenna, and radio network controller (RNC). As illustrated, the plurality of other devices connected to distributed communication network 330 include operator MCD 200, ELD 100, LE connect server 390, authorized $3^{rd}$ party device 395, and a plurality of geographically dispersed devices having BT beacon detectors 380. The dashed directional arrows indicate the direction of communication from one device to the network and vice versa. STCE 300 also includes GPS satellite 335, representative of a system of GPS satellites that provides GPS location data 375 to a plurality of the devices located on the ground.

With this interconnection of devices within STCE 300, one aspect of the disclosure provides for the tracking of a vehicle 320 that has an associated ELD 100 that registers and reports a LLSE. The sequence in which the various operations and communications occur are indicated alphabetically, with the main process operations bolded. As shown, ELD 100 transmits (A) a LL security notification to operator MCD 200. Operator MCD 200 provides the operator with a notification and options for identifying the event. In the illustrative embodiment, these options include deactivating the load lock, reporting the theft of the vehicle, and connecting to law enforcement, which also reports the theft. Concurrently, ELD 100 may transmit (B) LL security notification 250A to SM server 310, in one embodiment. In one or more embodiments, the option to report a theft or contact law enforcement is available to the operator at all times and is not triggered by receipt of the LL security notification from ELD 100.

Shipment monitoring server 310 receives the security event notification from the network 330 and retrieves the BT ID from the DB 315 associated with the vehicle and pushes/broadcasts (C) the BT ID within a be-on-the-lookout for (BOLO) notification that is received by devices supporting the BT beacon detectors 380. These devices include devices located at a plurality of detections points 385, such as truck stops and gas stations, and other devices such as operator MCD 200 or BT tag detectors located within other vehicles. According to one embodiment, BT Beacon detectors 380 can be programmed to download (D) a BT ID watch list comprised of multiple different BT IDs that the server 310 identifies as being looked for within the geographic area. When vehicle 320 passes within a detection range of one of these BT beacon detectors 380, e.g., at location B 335, while ELD 100 or separate BT tag 190 (FIG. 1) is broadcasting the BT ID, the unique BT ID is detected (E) by one or more of the DT beacon detectors 380, which respond by autonomously reporting (F) the detection of the BT ID at the given location and time to SM server 310 via network 330. Additionally, in embodiments in which the detection occurs on an operator MCD 200, operator MCD 200 outputs a BT ID reporting GUI 325 providing options for operator selection on how to report (F) the detection of the BT ID. Additional processing by SM server 310 is described below within method 800 description, presented by FIG. 8.

According to one aspect, shipment tracking and communication environment 300 presents a distributed security system with multiple geographically dispersed devices that collaborate to enable tracking of a stolen vehicle or cargo that has a BT tag with unique ID, in accordance with one or more embodiments. Each of multiple vehicles is assigned one of the BT tags with a unique ID, and the assignment is recorded within the shipment tracking database (315). When a theft is reported to the monitoring system, the MS server 310 effectively transmits a "be on the lookout for" (BOLO) notification of the unique ID of the BT tag to other BT detection devices in the field, such as the operators' MCDs and detectors issued to and/or installed at truck stops and gas stations. These other BT detection devices can detect BT signals within a specific range of the device (e.g., 200 feet), establishing a network covering a geographical area in which the stolen vehicle would travel. Any one of these BT detection devices would then report back to the MS server and/or to LE connect servers whenever unique ID within a detected BT beacon matches the unique ID that is associated with the stolen vehicle/cargo and received within the BOLO notification.

Figure 4A:
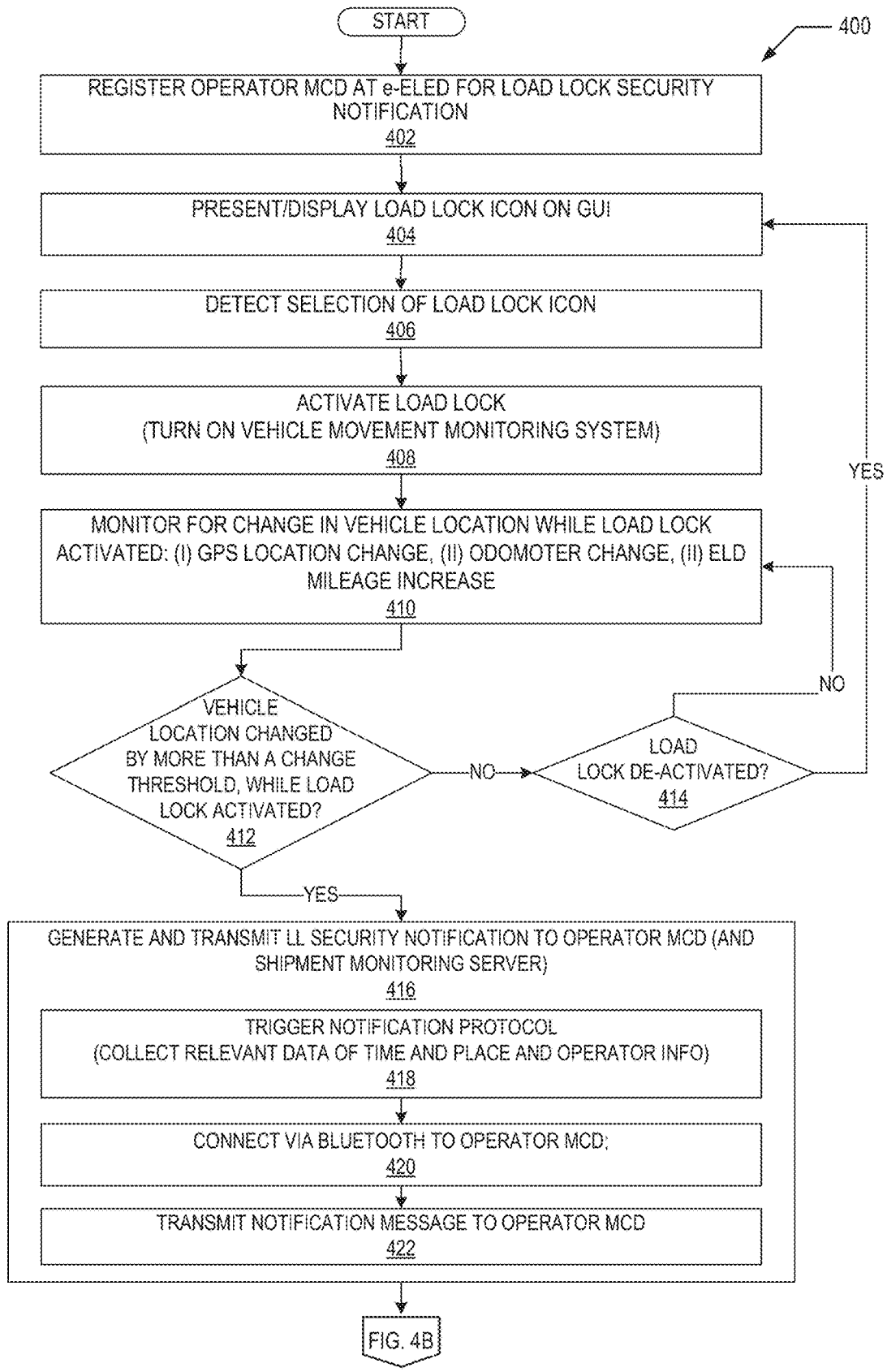
FIGS. 4A-4B is a flow chart illustrating a method of implementing load lock security utilizing an ELD and connected operator MCD, in accordance with one or more embodiments.
Figure 4B:
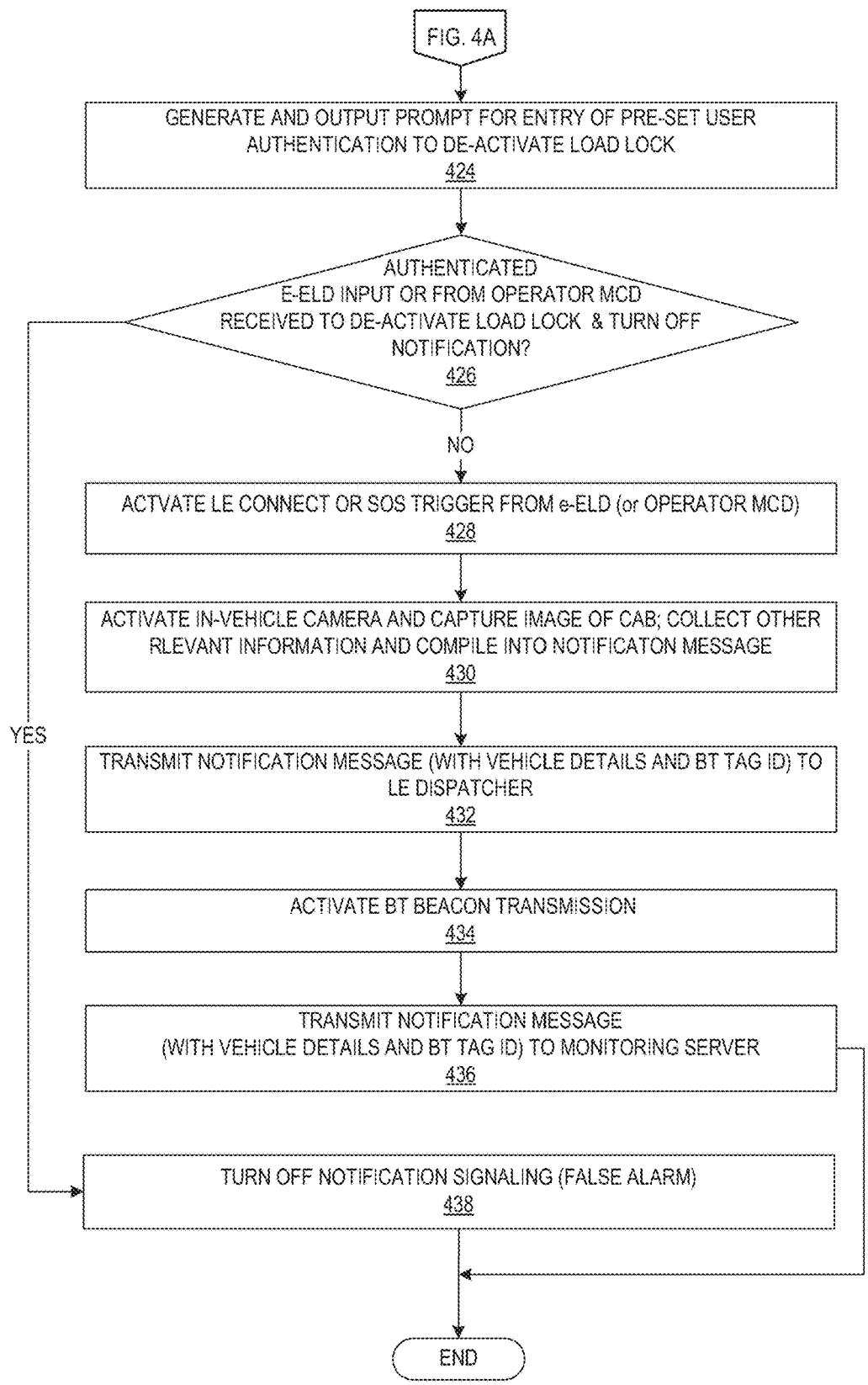

Turning now to FIGS. 4A-4B and with ongoing reference to the preceding figures, there is provided a flow chart depicting the method 400 by which ELD 100 operates within the above presented STCE 300 to provide the various features attributed to ELD 100 within the disclosure, and according to one or more embodiments. According to one aspect, the completion of each method completed by or within E-ELD presented herein involves execution by processor 110 of the program code of one or more of the plurality of modules stored on memory 120 or within storage 170 of ELD 100. The specific modules performing specific functions are not necessarily identified in the description but are understood to enable the performance of the associated function. For example, most of the processes described involve execution of load lock module 135, LL security notification module 136, and BT connect module 139. Other functions require execution of LE connect module 137 and wireless communication module 138. Still other functions require execution of stolen asset BT beacon detect and report module 129. Similarly, it is appreciated the different hardware components within E-ELD may be involved in completion of the various functions. However, for simplicity, certain of the method features are presented as being performed by processor 110, and others are presented as being performed by ELD 100 generally. It is appreciated that the described aspects of the various methods are fully automated, in one or more embodiments, but can be partially automated in some embodiments.

Method 400 begins at the start block and transitions to block 402 which includes registering, at an enhanced electronic logging device (ELD) of a vehicle, an operator mobile communication device (MCD) to receive notifications related to a load lock of the ELD. The load lock identifies that the operator has parked the vehicle and triggered the ELD to report any movement of the vehicle that occurs while the load lock is activated. Method 400 proceeds to presenting, on a display of the ELD, at least one selectable option for activating the load lock of the vehicle (block 404). Method 400 includes detecting at block 406 a selection of the load lock icon and activating (block 408) load lock in response to receiving an input that turns on the load lock status. Method 400 includes monitoring for a change in the vehicle location while the load lock is activated (block 410). The change can be determined by a GPS location change, a change in the odometer of the vehicle, an increase in the ELD mileage tracker, etc. Method 400 includes determining, at decision block 412, whether movement is detected while the load lock is activated. In one embodiment, the movement can be any movement above a pre-set threshold. For example, the load lock may allow for the vehicle to be moved vertically when picked up by a crane to place on a ship or 40 feet to allow for parking by someone other than the operator or lifting onto a tow truck bed. If no movement above the threshold is detected, method includes checking for receipt of a deactivation of the load lock (decision block 414). In response to receipt of a load lock deactivation (e.g., via input of a security passcode or biometric verification), method 400 transitions back to presenting the load lock icon as a selectable option on the GUI (block 404). Otherwise, method 400 continues to monitor for the change in vehicle location (block 410).

From decision block 412, when the change in vehicle location is detected, method 400 proceeds to generating and transmitting a notification of an unauthorized movement and/or potential theft of the vehicle (block 416). This process is triggered in response to receiving an input from at least one movement detection mechanism (MDM) indicating that the vehicle is moving or being moved from a parked location while the load lock is activated. The notification is transmitted to the operator MCD 200 and in some embodiments, the notification is also transmitted to the SM server 310. In other alternate embodiments, the notification to the SM server 310 occurs from the operator MCD 200 in response to operator input confirming the security event has occurred or after a time-out period (e.g., 30 seconds) without the operator responding to the notification of the security event.

According to one or more embodiments, transmitting of the notification is completed via at least one wireless transceiver from among a Bluetooth (BT) transmitter and a radio frequency identification (RFID) transmitter, the BT or RFID transmitter being pre-coded with a unique identification (ID)/signature and embedded in the vehicle to prevent easy removal. The BT or RFID beacon transmitter is maintained in a sleep/dormant state until triggered to initiate transmission of the unique signature by unexpected movement of the vehicle that is detected following activation of the load lock.

In one or more embodiments, the load lock can be activated autonomously based on one or more triggers, such as (i) the ELD 100 periodically implementing a presence scan and detecting when the operator has left the vehicle or moved from the driver's seat; (ii) the ELD 100 losing a connection to the operator MCD 100 as the operator walks away from the vehicle or if a jamming of signals occurs preventing connection to the operator MCD 100; (iii) detection of the vehicle's fuel access door being open, suggesting the vehicle is being refueled; etal. Autonomous activation of load lock allows for tracking of the device in situations where the operator forgets to manually activate load lock before the operator leaves the vehicle or when the vehicle is already too far away for the operator to activate load lock from the operator MCD because the BT signal is out of range.

According to one or more embodiments, and as further illustrated in FIG. 4A, generating the notification includes initiating a notification protocol that involves collecting relevant data (e.g., time and location and operator information) (block 418). Also, transmitting the notification includes activating a wireless transmission system of the ELD and initiating a wireless connection with the operator MCD (block 420) and transmitting the notification directly to the operator MCD via the wireless connection (block 422). According to yet another embodiment, generating and transmitting the notification includes establishing, via a corresponding wireless transceiver, an uplink to a base station of a communication network, and transmitting the notification to a SM server via the communication network.

Moving to FIG. 4B, method 400 includes in response to detecting the movement of the vehicle while the load lock is on, generating and outputting a prompt on the ELD GUI for entry of at least one of a pre-established/preset passcode or a biometric input to de-activate the load lock (block 424). Method 400 also incudes monitoring for receipt of the user entry within a preset time period and determining (at decision block 426) whether an authenticated user entry has been received from either the local input or from the operator MCD. When an authenticated user entry is received, method 400 includes terminating the notification to the operator MCD in response to receipt of the entry that matches a corresponding one of the passcode and the biometric input (block 438). Method then terminates at the end block.

According to one embodiment, in response to receipt, before expiration of the preset time period, of the entry that matches a corresponding one of the pre-established passcode or the pre-stored biometric input, method includes de-activating the load lock (e.g., by sending a load lock deactivated (LLD) signal) and stopping the notification to the operator MCD. Further, in response to not receiving a matching deactivation entry before expiration of the preset time period, method incudes initiating a broadcasting by the BT transceiver of a Bluetooth (BT) beacon with a unique BT ID of a BT tag embedded within one of the vehicle or the cargo.

However, in response to the received input not being authenticated or not receiving the authenticated input within a preset time-out period (e.g., 45 seconds) and in response to detecting selection of the LE connect icon, method 400 includes activating the LE connect feature and/or an SOS trigger function from one of ELD 100 or operator MCD 200 (block 428). Method 400 includes activating the in-vehicle camera to capture an image of the cab interior (block 430). Additional information that is relevant is also captured and compiled into a notification message. Method 400 includes transmitting the notification message to the LE dispatcher server (block 432). Method then includes activating transmitting of the BT beacon (block 434). Method 400 further includes transmitting the notification message, including vehicle details and the BT tag ID, to SM server 310 (block 436). Method 400 then terminates at the end block.

Figure 5:
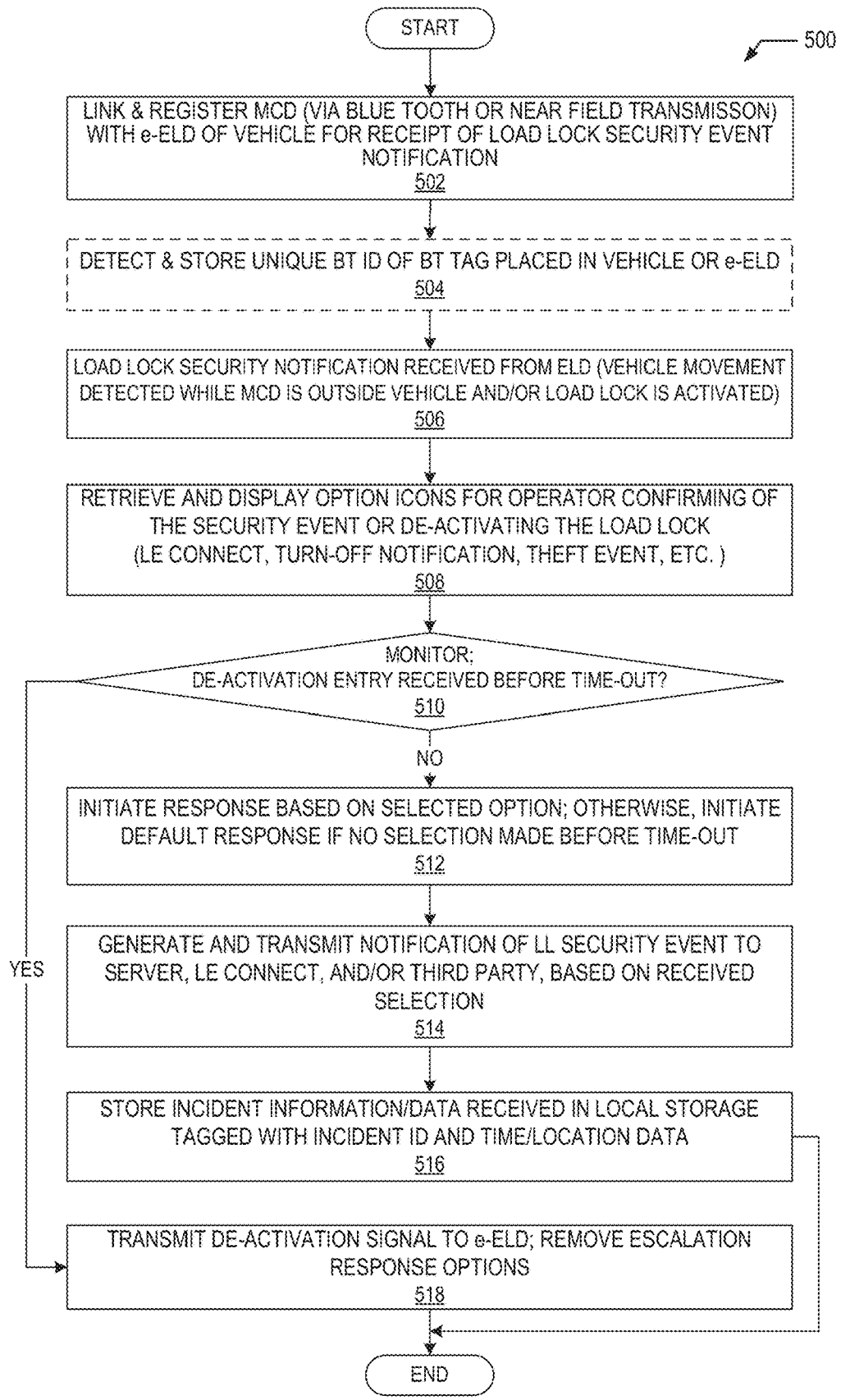
FIG. 5 is a flow chart illustrating a method of implementing load lock security response on an operator MCD, in accordance with one or more embodiments.

According to one aspect of the disclosure, several of the above features of the ELD 100 can also be performed by operator MCD 200 in one or more embodiments. The flow chart of FIG. 5 presents these and other features from the vantage point of the operator MCD 200. Thus, processor 210 of operator MCD 200 executes the various modules of operator MCD 200 to enable components within operator MCD 200 and generally operator MCD 200 to perform the described security event detection and reporting functions at/on operator MCD 200, as follows.

Following the start block, method 500 includes linking and registering an operator MCD 200 with an enhanced ELD 100 for receipt of notifications of movement of a vehicle while a load lock is active on the ELD. The operator MCD 200 has an MCD display device, a MCD wireless transceiver, a MCD memory having a load lock notification response module stored thereon, and an MCD processor 210 communicatively coupled to the MCD display 243, MCD wireless transceiver (250), and MCD memory 220. Method 500 optionally includes detecting and storing a unique BT ID of the BT tag placed/embedded in one of the vehicle, the cargo, and the ELD 100 (block 504). The advanced storage of the unique BT ID allows for transmission of this data to the SM server and/or LE connect server when a security event occurs and the vehicle is no longer in a BT detection range of the operator MCD 200. Method 500 includes receiving a LLSE notification from ELD indicating that vehicle movement is detected while the MCD is outside of the vehicle and load lock is activated (block 506). Method 500 also includes in response to receipt of the LLSE notification from the ELD 100, generating, by processor execution of the LLNR module 234, an alarm notifying the operator of at least one of the unauthorized movement or the potential theft of the vehicle and a user interface on the MCD display 243 with operator selectable options that include a confirmation prompt to de-activate the load lock or confirm the security event (block 508).

In one or more embodiments, generating the confirmation prompt further includes outputting a load lock (LL) graphical user interface (GUI) on the MCD display, the GUI comprising a deactivation prompt for the operator to enter one of a pre-established deactivation passcode or pre-stored biometric input. In one or more embodiments, the method 500 also includes outputting selectable options to the operator from among: (i) de-activating the load lock on entry of a correct deactivation code or biometric data; (ii) turning off the load lock mode on the ELD by sensing a presence of the operator within the cab of the vehicle; (iii) notifying law enforcement of the incident; (iv) notifying a SM server; (v) notifying an authorized third party; and (vi) capturing and transmitting an image of a cab interior of the vehicle via one or an ELD camera or a secondary camera installed within the vehicle, which captures an image of a driver space of the vehicle. Method 500 also includes monitoring for receipt of an entry, such as an override security code of biometric entry, before expiration of a time-out period, the receipt indicating that the notification is not a confirmed security event and the load lock is de-activated, and determining whether the de-activation entry is received before the time-out period expires (block 510). Method 500 includes initiating a response based on a selected option or time out condition occurring before an entry is received (block 512). Method 500 further includes, in response to at least one of (i) not receiving the de-activation entry code or biometric input before the timeout or (ii) receiving a selection identifying a specific type of active incident (e.g., theft) or (iii) receiving a selection of a particular handling of the received notification (e.g., forward to LE connect server), generating and transmitting at least one notification to one or more of (a) the SM server, (b) the law enforcement dispatcher server, and (c) the device of an authorized third party (block 514). Specifically, in response to receipt of a selection corresponding to notifying law enforcement, method 500 includes generating an incident report including (a) pre-entered/pre-stored identifying details of one or more of (i) the operator, (ii) the operator MCD, (iii) the vehicle, and (iv) cargo being transported, (b) a current location and time of the incident, and (c) a BT tag ID associated with the vehicle or cargo. Method 500 then includes forwarding the incident report to a LE dispatcher system and to a SM server and/or to other authorized interested parties. Method 500 then includes storing the received incident information in local storage tagged with an incident ID and time and location data (block 516).

Returning to decision block 510, in response to receipt of the deactivation entry prior to expiration of the time out period, method 500 includes transmitting the de-activation signal to the ELD 100 and removing the presented options for transmitting a notification to a third-party device or law enforcement (block 518). Method 500 then terminates at end block.

Figure 6:
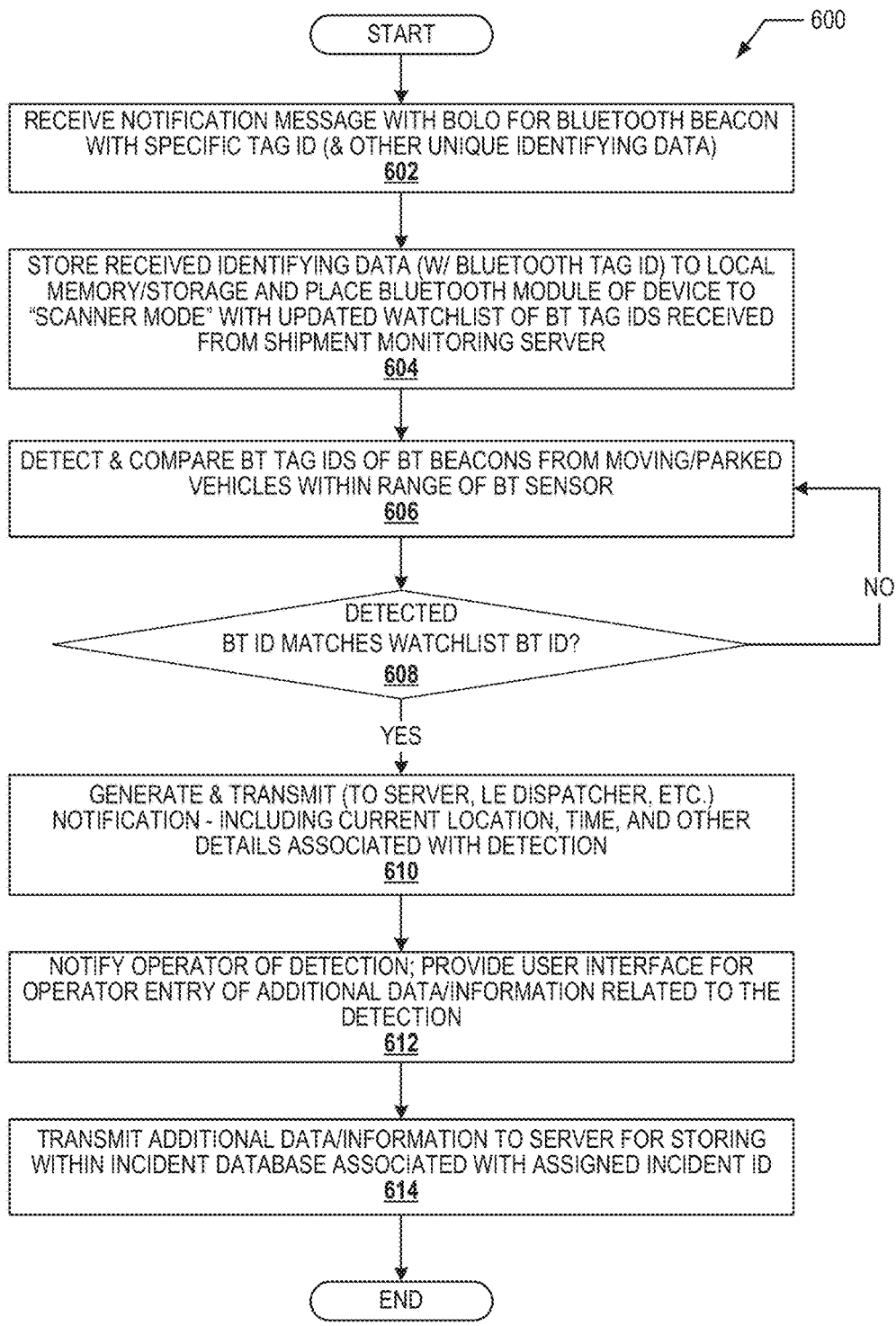
FIG. 6 is a flow chart illustrating a method of activating localized monitoring for a vehicle or cargo associated with a load lock security event using Bluetooth beacon detection and automated reporting of detected watchlist signals, in accordance with one or more embodiments.

FIG. 6 is a flow chart illustrating a method 600 for responding to receipt of a notification to monitor for a specific BT ID on a server-provided watchlist. The primary aspects of method 600 can be programmed to be performed within either ELD 100 or operator MCD 200; However, the description is provided from the perspective of operator MCD 200 and processor 210 of operator MCD 200 executing BT beacon detecting and reporting module 229. Method 600 begins at start block and proceeds to block 602 which provides operator MCD 200 receiving notification message with a BOLO for a BT beacon with specific unique BT tag ID (or other unique identifying data embedded in a Bluetooth beacon. In one or more embodiments, SM server 310 will transmit/broadcast the bolo to including a watch list of one or more Bluetooth beacons identified by their unique BT tag IDs. Method 600 includes storing the received identifying data to local memory and placing the Bluetooth transceiver in scanner mode to detect Bluetooth beacons that are within a detection range of the BT receiver (block 604). Method 600 includes detecting and comparing Bluetooth tag IDs of Bluetooth beacons detected within a range of the Bluetooth receiver (block 606). Method 600 includes determining at decision block 608 if a detected beacon BT ID matches one of the stored Bluetooth ID's on the watch list. If no match is detected, method 600 returns to block 606 to continue comparing detected BT IDs. However, in response to a detected Bluetooth IDs matching one of the stored Bluetooth IDs on the watchlist, method 600 includes generating and transmitting to the SM server 310 a notification that includes a current location and time and other details associated with the detection (block 610). Method 600 includes notifying the operator of the detection and providing a user interface for operator entry of additional data/information related to the detection (block 612). Method 600 includes transmitting the additional data/information to SM server 310 for storing within the incident database associated with the particular incident ID (block 614). Method 600 then terminates at end block.

Figure 7:
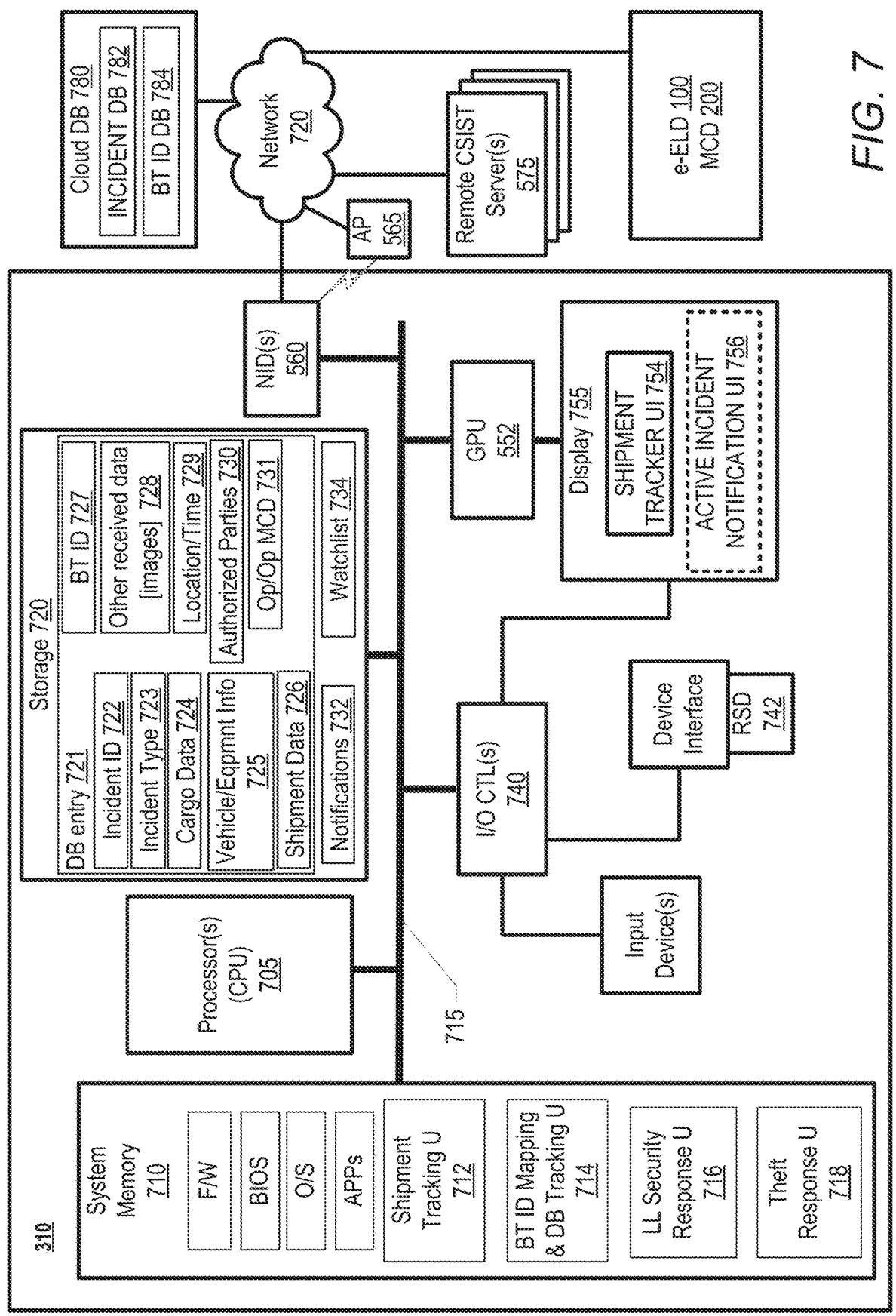
FIG. 7 is a block diagram representation of an example shipment monitoring server for use in monitoring shipments and implementing certain of the vehicle or cargo tracking features described herein, according to one or more embodiments.

Referring now to FIG. 7, there is illustrated a block diagram representation of an example SM server 310 within which various aspects of the disclosure can be implemented. While illustrated as a single server, it is appreciated that the processes provide can be implemented within a cluster of servers, where the servers can be co-located in a single location and/or geographically dispersed over a plurality of locations in a distributed system. Additionally, SM server 310 can be a virtual server 310 within a larger virtualized system having shared resources with other virtual servers. In other embodiments, SM server 310 can be any electronic device such as, but not limited to, a desktop computer, notebook computer, or a single server. Additionally, in one embodiment, SM server 310 can be implemented as a virtual machine sharing hardware resources of a physical server. In one embodiment, SM server 310 operates as a networked computing device providing a cloud infrastructure that supports implementation of a carrier and shipper interfacing and shipment tracking (CSIST) framework. Generally, SM server 310 can operate as both a data aggregator and/or a monitoring center computer. As a data aggregator, SM server 310 receives additional amounts of information from shipment-related entities to enable other features and functionalities. As a monitoring center computer, SM server 310 can be configured with additional software and firmware modules and components for receiving data, generating notifications, and responding to detected conditions within a SM environment.

Example SM server 310 includes at least one processor, and potentially a plurality of processors, generally referenced hereinafter as central processing unit (CPU) 705. CPU 705 is coupled to system memory 710, non-volatile storage 720, and input/output (I/O) controllers 740 via system interconnect 715. System interconnect 715 can be interchangeably referred to as a system bus, in one or more embodiments. One or more software and/or firmware modules can be loaded into system memory 710 (from storage 720 or other source) during operation of SM server 310. Specifically, in the illustrative embodiment, system memory 710 is shown having therein a plurality of software/firmware modules, including firmware (F/W), basic input/output system (BIOS), operating system (OS), and application(s). Additionally, system memory 710 includes shipment tracking utility 712, BT ID mapping and database tracking utility 714, LL security response utility 716, and theft response utility 718. While shown as a separate component, these various utilities can, in alternate embodiments, be provided as one combined application and/or as an executable module within F/W, for example. The software and/or firmware modules within system memory 710 enable SM server 310 to provide varying features and functionality when their corresponding program code is executed by CPU 705 or by secondary processing devices (not specifically shown) within SM server 310.

Local storage 720 includes a local copy of a unique BT ID mapping DB entry 721 (DB entry 721), downloaded from cloud DB 780, which is a repository of BT IDs mapped with other information such as the assigned vehicle, cargo, ELD, operator MCD, geographic location, route to destination, etc. Example DB entry 721 includes incident data, each tagged with a specific unique incident ID. Example data within DB 721 includes, without limitation incident ID 722, incident type 723, cargo data 724, vehicle/equipment information 725, shipment data 726, unique BT ID 727, other received data 728, including images captured by operator and/or ELD, location and time data 729, authorized interested/relevant party information 730, and operator and operator MCD ID 731. Local storage also maintains a copy of notifications 732 and BT ID watchlist 734. BT ID watchlist 734 is a compiled list of unique BT IDs for vehicles that have been reported as having been stolen or for which a LLSE notification has been received by MS server 310. BT ID watchlists 734 includes the list of BT IDs that are being broadcasted by an associated BT beacon transmitter located within the vehicle or cargo or embedded within the ELD. In at least one embodiment, several different BT ID watchlists 734 are maintained by MS server 310. These different BT ID watchlists 734 are separated into groups based on an expected geographic location of the vehicles to which the BT IDs are associated. Thus, during download of a watchlist, an operator MCD will only receive those BT IDs that would be detected within the current geographic location of the operator MCD. It is appreciated that the geographic location can be a radius of N miles, where N is a number greater than zero and can be a static value (e.g., 50 miles) or a dynamically determined value that is based on factors such as the elapsed time since the occurrence of the security incident, the geographic location ad terrain, the maximum velocity of the vehicle, the climatic conditions, etc. MS Server 310 evaluates the known and received conditions to identify which BT IDs to include in each of the watchlists and the size of the geographic location to be covered by the broadcast of the watchlist.

Referring again to FIG. 7, I/O controllers 740 support connection by and processing of signals from one or more connected input device(s). I/O controllers 740 also support connection with and forwarding of output signals to one or more connected output devices. I/O controllers 740 can also provide a device interface to which one or more removable storage device(s) (RSD(s)) 742 can be received. In one or more embodiments, RSD 742 is a non-transitory computer program product or computer readable storage device. In accordance with one embodiment, the functional modules (e.g., LLSR utility 716 and Theft Response utility 718) described herein and the various aspects of the disclosure can be provided as a computer program product. The computer program product includes one or more RSDs 742 as a computer readable storage medium on which is stored program code of the different utilities (712-718). When executed by a processor (e.g., CPU 705), the program code of the various utilities (712-718) causes the processor 705 to implement the functions described herein as being completed by SM server 310, including, but not limited to, the features illustrated within method 800 of FIG. 8, which is described below.

SM server 310 further includes network interface device (NID) 760, which enables SM server 110 and/or components within SM server 110 to communicate and/or interface with other devices, services, and components that are located external to SM server 110. In one or more embodiments, SM server 110 connects to remote database (DB) 780, via external communication network(s) 770, using one or more communication protocols. While not shown, MS server 310 includes an integrated communication module that enables MS server 310 to communicate via ND 760 with other devices connected via an external network. For purposes of discussion, communication network 770 is indicated as a single collective component for simplicity. However, it is appreciated that communication network 770 can comprise one or more direct connections to other devices as well as a more complex set of interconnections as can exist within a wide area network, such as the Internet. Remote cloud DB 780 includes incident tracking and reporting database 782 and a copy of DB entry 721 within larger BT ID DB 784.

Figure 8:
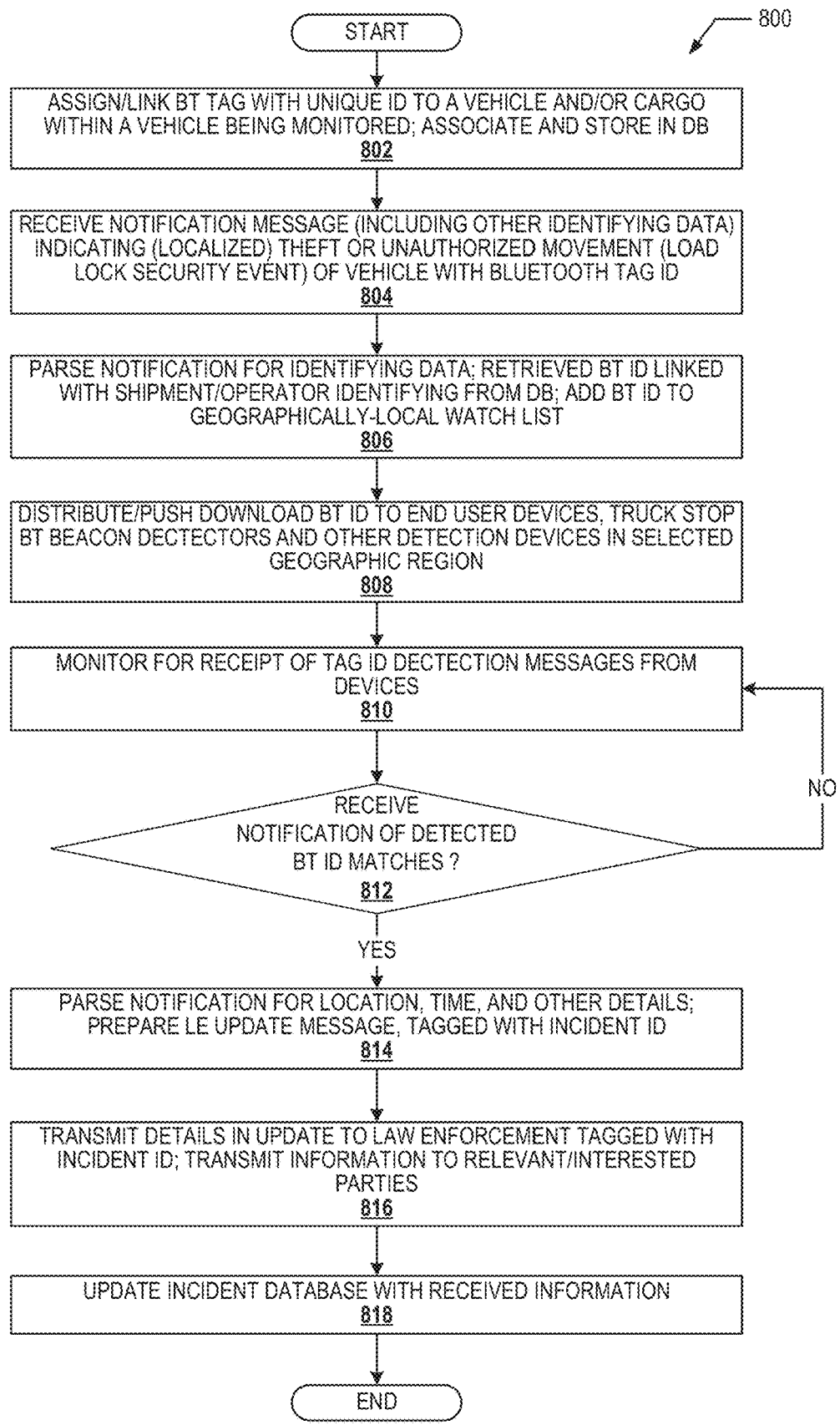
FIG. 8 is a flow chart illustrating a method by which the shipment monitoring server operates to support the server-level load lock security response features described herein, in accordance with one or more embodiments.

Turning now to FIG. 8, there is provided a flow chart of a method 800 performed by SM server 310 for tracking and detecting stolen vehicles and cargo, including vehicles being driven with a load lock activated on an assigned ELD 100. Method 800 includes assigning or linking a Bluetooth (BT) tag to a registered vehicle transporting cargo that is being monitored by a shipment monitoring service, the BT tag including a unique identifier (block 802). Block 802 of method 800 also includes associating the unique ID of the assigned BT tag with other identifying information of the shipment vehicle/cargo/operator and storing the unique ID and associated identifying information to a database of tracked shipments and equipment. Method 800 includes receiving, from at least one of an operator MCD 200 and an ELD 100, at MS server 310, a notification of a theft event or unauthorized movement of the vehicle (i.e., an LLSE) associated with a monitored shipment or vehicle that is equipped with the BT tag (block 804). Method 800 further includes parsing the notification to retrieve the vehicle or operator ID and retrieving the unique BT tag ID from the database, based on the received vehicle or operator ID (block 806). In one embodiment, the BT ID is added to a geographically local watchlist, with broadcast location based on the location and time in which the theft event (or LLSE) occurred. Method 800 includes transmitting (or broadcasting via a geographically specific push or download) the unique ID to a plurality of BT signal detection devices that are geographically located in a geographical area corresponding to the location of the theft event (block 808). According to one embodiment, the transmitted signal includes an activation trigger to activate the BT signal detection devices to initiate monitoring operation to detect BT beacon signals being broadcasted and identify any matches of the unique BT IDs with the detected BT beacon within a detection range of the BT signal detection device. Method 800 includes monitoring for receipt of a confirmed detection of the unique ID by one or more of the BT signal detection devices (block 810). Method 800 further includes, in response to receipt of a confirmed detection, as determined at decision block 812, parse the received message for time and location data and any other transmitted information and prepare a law enforcement update message with the particular incident ID (block 814). When no notification is received, method returns to block 810 to continue monitoring for receipt of tag ID detection messages. Method 800 includes transmitting relevant details of the confirmed detection to law enforcement and other relevant parties (block 816). Method 800 then includes updating the database with confirmed detection information, including time and location and any additional details received (block 818). Method 800 then terminates at end block.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It is further appreciated that the majority of the above-described method processes can be provided as program code on a computer program product. Thus, aspects of the disclosure can be described as a computer program product having program code that when executed by a processor in an electronic device performs the aforementioned method functions. The computer program product can be described as being non-transitory.

As further described herein, implementation of the functional features of the disclosure described herein can involve use of a combination of hardware, firmware, as well as several software-level constructs (e.g., program code and/or program instructions and/or pseudo-code) that execute to provide a series of methods that present the different features and functions of the disclosure.

In the above description, exemplary embodiments in which various aspects of the disclosure may be practiced are described in general detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof. Other aspects of the disclosure that stem from and/or are extensions of the above described processes are presented generally within the aforementioned descriptions and/or the figures accompanying this submission. Nothing within the present descriptions are to be taken as limiting on the scope of the greater application of the disclosure within the shipping and transportation industry/space or more general perishable product space.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic logging device (ELD) comprising:
a display device that presents at least one user interface (UI);
at least one user input device;
at least one wireless transceiver that communicatively connects the ELD to external devices including an operator mobile communication device (MCD);
at least one movement detection mechanism (MDM) that detects movement of a vehicle associated with the ELD;
a memory having stored thereon a plurality of function modules, the plurality of function modules comprising a wireless network communication module, a near field communication module, a load lock module, and a security event notification module; and
a processor communicatively coupled to the display device, the at least one input device, the wireless transceiver, the MDM, and the memory and which processes selected ones of the plurality of functional modules to:
register the operator MCD to receive notifications about load lock security events;
present on the display device at least one selectable option for activating a load lock of the vehicle, the load lock identifying that an operator has parked the vehicle and has triggered the ELD to report any movement of the vehicle that occurs while the load lock is activated;
activate the load lock in response to receiving an input to turn on the load lock;
generate and transmit a notification of an unauthorized movement and/or a potential theft of the vehicle in response to receiving an input from the MDM indicating that the vehicle is moving or being moved from a parked location while the load lock is activated;
in response to detecting movement of the vehicle while the load lock is on, generate and output a prompt for entry of at least one of a pre-established passcode or a pre-stored biometric input to deactivate the load lock; and
in response to not receiving a matching deactivation entry before expiration of a preset time period, initiate broadcasting by the BT transceiver of a Bluetooth (BT) beacon with a unique BT ID of a BT tag embedded within one of the vehicle a cargo, the BT beacon being detectable by other BT receivers that are within a detection range of the BT transceiver.

2. The ELD of claim 1, wherein:
the MDM comprises one of (i) a motion sensor; and (ii) an interface for connecting to a motion sensor; (iii) a global positioning system (GPS) tracker; and (iv) a wireless signal transceiver that enables triangulation of wireless signals to determine relative positioning of the ELD; and
the at least one wireless transceiver comprises at least one of a Bluetooth (BT) transceiver or a radio frequency identification (RFID) transceiver, the BT or RFID transceiver; and
the notification is a load lock security event (LLSE) notification, which indicates movement of the vehicle while the load lock is activated.

3. The ELD of claim 1, wherein the at least one wireless transceiver comprises a near field or Bluetooth wireless transceiver, and to generate and transmit the notification, the processor configures the ELD to:
activate a near field wireless transceiver;
initiate a wireless connection with the operator MCD; and
transmit the notification directly to the operator MCD via the wireless connection.

4. The ELD of claim 1, wherein to generate and transmit the notification, the processor configures the ELD to:

establish, via a corresponding wireless transceiver, an uplink to a base station of a communication network; and transmit the notification via the communication network to at least one of a shipment monitoring (SM) server, a law enforcement (LE) connect server, or an authorized third party device.

5. The ELD of claim 1, wherein the processor further configures the ELD to:

monitor for receipt of the entry within a preset time period; and in response to receipt, before expiration of the preset time period, of the entry that matches a corresponding one of the pre-established passcode or the pre-stored biometric input:

deactivate the load lock; and stop the notification to the operator MCD.

6. The ELD of claim 5, wherein in de-activating the load lock, the processor configures the ELD to:

trigger the BT transceiver to stop transmitting the BT beacon;

stop sending the LLSE notification to the operator MCD; and transmit a load lock deactivated (LLD) signal to the SM server.

7. The ELD of claim 1, the memory further comprising a BT tag ID detection and reporting (TDR) module and the ELD further comprising one of an integrated BT receiver or an interface with a separate BT receiver that detects BT beacons, wherein the processor processes the BT TDR module, which configures the ELD to:

receive, via one of a manual input and a SM server download/broadcast, a watchlist comprising at least one BT ID of a BT tag associated with one of a vehicle and a cargo that is being searched for;

in response to receiving the watchlist: store the at least one BT ID; and activate a BT TDR function to cause the BT receiver to initiate scanning for BT beacons within a range of detection of the BT receiver;

in response to the BT receiver detecting a next BT beacon, compare an ID of the BT beacon to the stored BT ID; and in response to the ID of the BT beacon matching the stored BT ID: generate an ID-detected notification comprising the BT ID and a current vehicle location and time; output the ID-detected notification on the ELD; and transmit the ID-detected notification to at least one of the operator MCD, the SM server, a LE connect server, and an authorized third party.

8. The operator MCD of claim 1, comprising a MCD display device, a MCD wireless transceiver, a MCD memory having a load lock security notification response (LLSNR) module stored thereon, and an MCD processor communicatively coupled to the MCD display, MCD wireless transceiver, and MCD memory, and which configures the operator MCD to:

register with the ELD for receipt of the notifications of movement of the vehicle while the load lock is active;

in response to receipt of a notification from the ELD, output a load lock (LL) graphical user interface (GUI) on the MCD display, the GUI comprising a deactivation prompt for the operator to enter one of a pre-established deactivation passcode or pre-stored biometric input;

monitor for correct entry of the deactivation code or biometric input before expiration of a time-out period; and in response to at least one of (i) not receiving a correct deactivation entry within the time-out period or (ii) receiving selection of an entry identifying at least one type of active incident or a type of desired response, transmit at least one notification to one or more of (a) a shipment monitoring (SM) server, and (b) a law enforcement dispatcher computer, and (c) an authorized third party.

9. The operator MCD of claim 8, wherein to output the LL GUI, the operator MCD is configured to:

generate and output (i) an alarm notifying the operator of at least one of the unauthorized movement or the potential theft of the vehicle and (ii) a user interface on the MCD display with operator selectable options that include a confirmation prompt to de-activate the load lock or confirm the security event;

output selectable options to the operator from among: (i) de-activating the load lock on entry of a correct deactivation code or biometric data; (ii) turning off load lock mode on the ELD by sensing a presence of the operator within the cab of the vehicle; (iii) notifying law enforcement of the incident; (iv) notifying a SM server; (v) notifying an authorized third party; and (vi) capturing and transmitting an image of a cab interior of the vehicle via one or an ELD camera or a secondary camera installed within the vehicle, which captures an image of a driver space of the vehicle; and in response to receipt of a selection of the option to notify law enforcement, generate an incident report including (a) pre-entered/pre-stored identifying details of one or more of (i) the operator, (ii) the operator MCD, (iii) the vehicle, and (iv) cargo being transported, (b) a current location and time of the incident, and (c) a BT tag ID associated with the vehicle or cargo; and forward the incident report to a LE connect server and to a SM server and/or other authorized interested party devices.

10. A method for tracking vehicles and cargo, the method comprising:

registering, at an enhanced electronic logging device (ELD) of a vehicle, an operator mobile communication device (MCD) to receive notifications related to a load lock of the ELD, the load lock identifying that the operator has parked the vehicle and triggered the ELD to report any movement of the vehicle that occurs while the load lock is activated;

presenting, on a display of the ELD, at least one selectable option for activating the load lock of the vehicle;

activating the load lock in response to receiving an input that turns on the load lock;

generating and transmitting a notification of at least one of unauthorized movement or a potential theft of the vehicle in response to receiving an input from at least one movement-detection mechanism (MDM) indicating that the vehicle is moving or being moved from a parked location while the load lock is activated;

in response to detecting movement of the vehicle while the load lock is on, outputting a prompt for entry of at least one of a pre-established passcode or a pre-stored biometric input to deactivate the load lock; and in response to not receiving a matching deactivation entry before expiration of a preset time period, triggering broadcasting by a Bluetooth (BT) transceiver of a Bluetooth (BT) beacon with a unique BT ID of a BT tag embedded within one of the vehicle or a cargo, the BT beacon being detectable by other BT receivers that are within a detection range of the BT transceiver.

11. The method of claim 10, wherein:
the notification is a load lock security event (LLSE) notification, which indicates movement of the vehicle while the load lock is activated;
the ELD comprises at least one of near field and a Bluetooth transceiver; and
generating and transmitting the notification comprises:
activating one of the near field and Bluetooth transceiver;
initiating a wireless connection with the operator MCD via the activated one of the near field or Bluetooth transceiver; and
transmitting the notification directly to the operator MCD via the wireless connection.

12. The method of claim 10, wherein generating and transmitting the notification comprises:
establishing, via a corresponding wireless transceiver, an uplink to a base station of a communication network; and
transmitting the notification via the communication network to at least one of a shipment monitoring (SM) server, a law enforcement connect server, and an authorized third party.

13. The method of claim 10, further comprising:
monitoring for receipt of the entry within a preset time period; and
in response to receipt, before expiration of the preset time period, of the entry that matches a corresponding one of the pre-established passcode or the pre-stored biometric input: de-activating the load lock, the de-activating comprising triggering the BT transceiver to stop transmitting the BT beacon, stopping a transmission of the LLSE notification to the operator MCD, and transmitting a load lock deactivated (LLD) signal to the SM server.

14. The method of claim 10, further comprising:
receiving, via one of a manual input and a SM server download/broadcast, a watchlist comprising at least one BT ID of a BT tag associated with one of a vehicle and a cargo that is being searched for;
in response to receiving the watchlist: storing the at least one BT ID; and activating a BT TDR function to cause the BT receiver to initiate scanning for BT beacons within a range of detection of the BT receiver;
in response to the BT receiver detecting a next BT beacon:
comparing an ID of the BT beacon to the stored BT ID; and
in response to the ID of the BT beacon matching the stored BT ID: generating an ID-detected notification comprising the BT ID and a current vehicle location and time; outputting the ID-detected notification on the ELD; and transmitting the ID-detected notification to at least one of the operator MCD, the SM server, a LE connect server, and an authorized third party.

15. The method of claim 10, further comprising:
autonomously activating the load lock based on one or more triggers from among: (i) the ELD periodically implementing a presence scan and detecting when the operator has left the vehicle or moved from the driver's seat; (ii) the ELD losing a connection to the operator MCD as the operator walks away from the vehicle or if a jamming of signals occurs preventing connection to the operator MCD; and (iii) detection of the vehicle's fuel access door being open, suggesting the vehicle is being refueled.

16. A non-transitory computer program product comprising program code that when executed by a processor in an electronic device performs the functions of claim 10.

17. A method comprising:
registering an operator mobile communication device (MCD) with an enhanced electronic logging device (ELD) for receipt of notifications of movement of a vehicle while a load lock is active, the operator MCD having an MCD display device, a MCD wireless transceiver, a MCD memory having a load lock security notification response (LLSNR) module stored thereon, and an MCD processor communicatively coupled to the MCD display, MCD wireless transceiver, and MCD memory;
in response to receipt of the notification from the ELD, outputting a load lock (LL) graphical user interface (GUI) on the MCD display, the GUI comprising a deactivation prompt for the operator to enter one of a pre-established deactivation passcode or pre-stored biometric input;
monitoring for correct entry of the deactivation code or biometric input before expiration of a time-out period; and
in response to at least one of (i) not receiving a correct deactivation entry within the time-out period or (ii) receiving selection of an entry identifying at least one type of active incident or a type of desired response:
transmitting at least one notification to one or more of (a) a shipment monitoring (SM) server, and (b) a law enforcement dispatcher computer, and (c) an authorized third party; and
triggering broadcasting by a Bluetooth (BT) transceiver of a Bluetooth (BT) beacon with a unique BT ID of a BT tag embedded within one of the vehicle or a cargo, the BT beacon being detectable by other BT receivers that are within a detection range of the BT transceiver.

18. The method of claim 17, wherein outputting the deactivation prompt further comprises:
generating and outputting an alarm notifying the operator of at least one of the unauthorized movement or the potential theft of the vehicle;
outputting selectable options to the operator from among: (i) de-activating the load lock on entry of a correct deactivation code or biometric data; (ii) turning off load lock mode on the ELD by sensing a presence of the operator within the cab of the vehicle; (iii) notifying law enforcement of the incident; (iv) notifying a SM server; (v) notifying an authorized third party; and (vi) capturing and transmitting an image of a cab interior of the vehicle via one or an ELD camera or a secondary camera installed within the vehicle, which captures an image of a driver space of the vehicle; and
in response to receipt of a selection of the option of to notify law enforcement, generating an incident report including (a) pre-entered/pre-stored identifying details of one or more of (i) the operator, (ii) the operator MCD, (iii) the vehicle, and (iv) cargo being transported, (b) a current location and time of the incident, and (c) a BT tag ID associated with the vehicle or cargo; and
forwarding the incident report to a LE connect server and to a SM server and/or other authorized interested party devices.

19. A method performed by a SM server for tracking and detecting stolen vehicles and cargo, the method comprising:

assigning a Bluetooth (BT) tag to a registered vehicle transporting cargo that is being monitored by a shipment tracking service, the BT tag including a unique identifier;

associating the unique ID of the assigned BT tag with other identifying information of the shipment vehicle/cargo/operator and storing the unique ID and associated identifying information to a database of tracked shipments and equipment;

receiving, from at least one of an operator MCD or an enhance electronic logging device (ELD), at a shipment tracking server, a notification of a theft event associated with a tracked shipment or vehicle that is equipped with the BT tag;

parsing the notification to retrieve the vehicle or operator ID;

retrieving the unique ID of the BT tag from the database, based on the received vehicle or operator ID;

transmitting the unique ID to a plurality of BT signal detection devices geographically located in a geographical area corresponding to the location of the theft event, the transmitting including an activation trigger to activate the BT signal detection devices to initiate monitoring operation by the BT signal detection devices to identify any matches in unique IDs of detected BT tags within a detection range of the BT signal detection device and the unique ID of the stolen vehicle or cargo;

monitoring for receipt of a confirmed detection of the unique ID by one or more of the BT signal detection devices; and in response to receipt of the confirmed detection:
  recording a location and time of the confirmed detection;
  transmitting relevant details of the confirmed detection to law enforcement and other relevant parties; and
  updating the database with confirmed detection information, including time and location and any additional details received.

* * * * *